United States Patent
Rollo et al.

(10) Patent No.: US 12,467,819 B1
(45) Date of Patent: Nov. 11, 2025

(54) NON-CONTACT INSPECTION FOR FINDING LEAKS IN LIQUID PAPERBOARD CARTONS

(71) Applicant: Teledyne Instruments, Inc., Thousand Oaks, CA (US)

(72) Inventors: Aaron J. Rollo, Marstons Mills, MA (US); Michael C. O'Keefe, E. Falmouth, MA (US); Andrey K. Morozov, N. Falmouth, MA (US); Shawn McAteer, Plainville, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 19/022,664

(22) Filed: Jan. 15, 2025

(51) Int. Cl.
    *G01M 3/04* (2006.01)
    *G01F 23/288* (2006.01)

(52) U.S. Cl.
    CPC ............. *G01M 3/04* (2013.01); *G01F 23/288* (2013.01)

(58) Field of Classification Search
    CPC ............ G01M 3/04; G01M 3/12; G01M 3/24; G01M 3/36; G01M 3/38; G01F 23/288
See application file for complete search history.

(56) References Cited

U.S. PATENT DOCUMENTS

| | | | | |
|---|---|---|---|---|
| 8,179,434 B2 * | 5/2012 | Koval | ................... | G06T 7/0006 |
| | | | | 382/141 |
| 10,147,176 B1 * | 12/2018 | Sones | ..................... | H04N 23/60 |
| 2018/0172603 A1 * | 6/2018 | Piana | ...................... | B67B 3/261 |

* cited by examiner

*Primary Examiner* — David Z Huang
(74) *Attorney, Agent, or Firm* — K&L Gates LLP

(57) ABSTRACT

A container inspection head includes a housing defining an inspection zone, a container detection system, a first sensor, and a second sensor. The first sensor may be disposed opposite the second sensor across the inspection zone. A container inspection system includes the container inspection head and a control circuit. The control circuit determines that the container has entered the inspection zone, receives first sensor data from the first sensor and second container sensor data from the second sensor while the container traverses the inspection zone. The control circuit characterizes a feature of the container based on the first and second sensor data and determine a leakage measure of the container based on the characterized feature. A method of inspecting a container may further include rejecting the container when the container leakage measure is outside a predetermined leakage measure range.

19 Claims, 20 Drawing Sheets

NON-CONTACT INSPECTION FOR FINDING LEAKS IN LIQUID PAPERBOARD CARTONS

BACKGROUND

The subject matter described in the present disclosure relates to systems and methods for detecting leaks in deformable sealed containers filled with a liquid material. In one currently available system, a small sample of unfilled and unsealed containers are filled with a dye and leakage of the dye from the containers is determined. This method is a statistical method that essentially determines a probability of fluid leakage from a batch (population) of pre-fabricated containers. Such a statistical test may require a large number of samples to be statistically valid. Further, the method is destructive so that the containers under test may not be used for products and are therefore wasted. In another currently available system, measurements are made of the surfaces of the filled and sealed containers to determine their curvature. The filled containers may be alternately placed in an evacuated environment and a normal pressure environment. The curvature of the container surfaces may be determined under the two conditions, and a potential for leakage may be determined by looking at the differences. However, this method may require the containers to be stationary and isolated during the curvature tests. It is desirable to determine leakage of individually filled and sealed containers under process conditions in which the containers continually move along a process conveyor system. In this manner, leakage testing may be applied to all of the filled and sealed containers during the process to allow continued throughput of the filled and sealed containers along the product line.

SUMMARY

In one aspect, a container inspection system may include an inspection head and a control circuit comprising a processor and a memory circuit. The inspection head may include a housing having a first portion and a second portion defining an inspection zone therebetween. The inspection head may also include a container detection system to detect a presence of a container in the inspection zone, a first container sensor disposed in the first portion and a second container sensor disposed in the second portion. The first container sensor may include a first container sensor surface that is directed towards the inspection zone, and the second container sensor may include a second container sensor surface that is directed towards the inspection zone. The memory circuit of the control circuit may include instructions that when executed by the control circuit, causes the control circuit to receive detection data from the container detection system, determine that the container has entered the inspection zone based on the detection data, receive first container sensor data from the first container sensor and receive second container sensor data from the second container sensor while the container traverses the inspection zone, characterize a feature of the container based at least in part on the first container sensor data and the second container sensor data, and determine a leakage measure of the container based at least in part on the characterized feature.

In one aspect, a container inspection head may include a housing having a first portion and a second portion defining an inspection zone therebetween, a container detection system to detect a presence of a container in the inspection zone, and a first container sensor disposed on a first container sensor carriage disposed in the first portion and a second container sensor disposed on a second container sensor carriage disposed in the second portion. The first container sensor may include a first container sensor surface directed towards the inspection zone, and the second container sensor may include a second container sensor surface directed towards the inspection zone. In some examples, the first container sensor may be disposed opposite to the second container sensor across the inspection zone.

In one aspect, a method of inspecting a container, may include traversing a container through an inspection zone of a container inspection head, contacting a first surface of the container with a first emission of a first container sensor, contacting a second surface of the container with a second emission of a second container sensor, receiving a first backscatter from the first surface and a second backscatter from the second surface, determining a first characteristic of the first surface from the first backscatter and a second characteristic of the second surface from the second backscatter, determining a container leakage measure at least from the first characteristic and the second characteristic, and rejecting the container when the container leakage measure is outside of a predetermined leakage measure range.

FIGURES

Various features of the embodiments described herein are set forth with particularity in the appended claims. The various embodiments, however, both as to organization and methods of operation, together with advantages thereof, may be understood in accordance with the following description taken in conjunction with the accompanying drawings as follows.

DETAILED DESCRIPTION

Fluids may be delivered to an end user in a variety of packages constructed of a variety of materials and have a variety of shapes and sizes. In all cases, it is important the integrity of the containers be maintained to prevent leakage. Container leakage is undesirable for several reasons. A fluid leak may result in the end user receiving less of the fluid than indicated on the container, leading to end user dissatisfaction. Fluid leakage may also leave undesirable fluid on the outside of the container or on surfaces beneath the container. If the container includes an air space above the fluid in the container (the container ullage region), the fluid may not leak out but ambient air may leak into the container. If the fluid is a nutritional material (such as milk) ambient air leakage may result in pathogens entering the fluid, which may result in the fluid becoming unusable due to microbial exposure.

As discussed above, it may be useful to have a system and method to determine container leakage for each fluid-filled container shortly after the containers are filled and sealed. In this manner, any individual leaking container may be identified and removed before shipment, thereby preventing leaking containers from being shipped to an end user.

Figure 1:
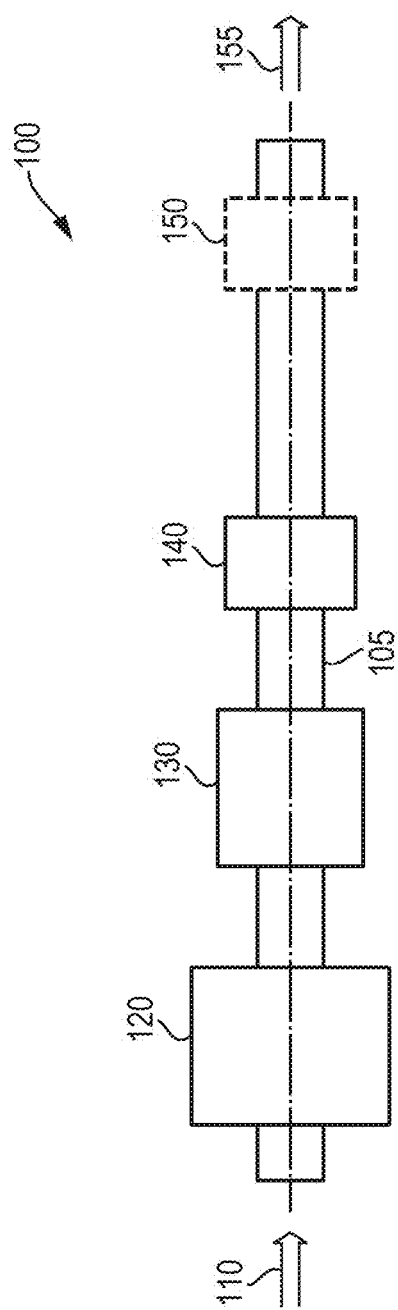
FIG. 1 is a block diagram of a container fill and inspection system according to one aspect of the present disclosure.

In one aspect, the containers may be fabricated from a paperboard packaging material. Such material may be lightweight, cost effective, and may be potentially recyclable. Alternative materials for the container may include any one or more of several layers of plastic, cardboard, aluminum, polymers and other various materials. A producer may receive the paperboard packaging material as preformed flat sheets that may be folded to the desired shape, filled with a fluid, and then sealed. The folding, filling, and sealing steps may occur along a production line having a conveyor. FIG. 1 depicts a block diagram of one aspect of a container fill and inspection system 100. Container fill and inspection system 100 may rely on a conveyor system 105 to transport items between successive production subsystems. The production subsystems may include a receiving subsystem 110 where the raw paper board packaging material is introduced to inspection system 100. A folder/filler subsystem 120 may first fold the raw paper board packaging material into a predetermined-shaped container and then fill the container with a fluid. In one aspect, the container may be filled with a fluid that is initially heated (hot filled container). In another aspect, the container may initially be heated with steam (steam flushed) before the fluid is introduced. The container may then be sealed. A filled and sealed container may be capped at a capper subsystem 130. A capped container may be transported to a fluid leakage detection subsystem 140 where a capped and sealed container may be inspected for leaks. Additional subsystems may also be included in container fill and inspection system 100. For example, if the raw paper board packaging material is not originally labeled, a container may be transported to a labeling subsystem 150. An additional subsystem may include a container fill detection subsystem to determine an amount fluid within a container. A further subsystem may include a container rejection subsystem that may remove a leaky container from conveyor system 105 before being transported for shipping. The finished product may be transported 155 to a shipping location for transport to an end user, a wholesaler or a retail location.

Figure 2:
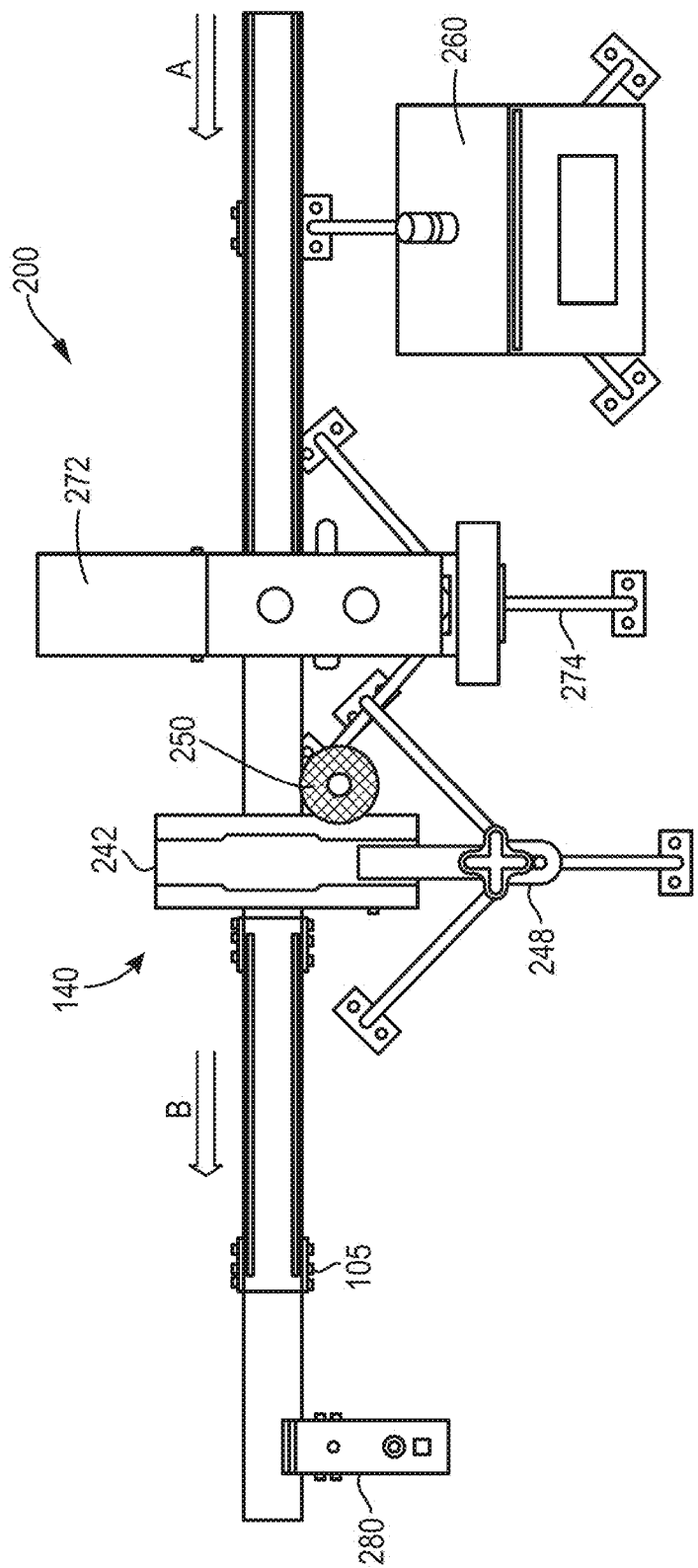
FIG. 2 is a side view of the container inspection system depicted in FIG. 1 according to one aspect of the present disclosure.

FIG. 2 depicts a side view of a portion 200 of inspection system 100 depicted in FIG. 1. FIG. 2 illustrates some aspects of inspection system 100 downstream from capper subsystem 130 (see FIG. 1). Arrows A and B indicate the direction of travel of a container through portion 200. A container may be placed on conveyor system 105 for transport through the subsystems depicted in FIG. 2. After passing through the capper subsystem, the container may pass through a container fill detection subsystem comprising a fill detector 272 and a support stand 274 for fill detector 272. Support stand 274 may be used to place fill detector 272 in a position relative to the conveyor system 105 so that a container may be transported through a detection zone of fill detector 272. Support stand 274 may be used to adjust linear axes (x, y, and z) of fill detector 272 relative to axes defining conveyor system 105. Support stand 274 may also adjust the angular axes (roll, pitch, and yaw) of fill detector 272 relative to conveyor system 105.

In one aspect, fill detector 272 may determine a fluid level within a container. In one example, fill detector 272 may determine a fluid level within a container using X-Ray detection methods. In one example, fill detector 272 may include an X-ray source, such as an X-Ray tube or other electrically operated X-Ray sources. When a container traverses fill detector 272, fill detector 272 may cause the X-Ray source to emit X-Rays directed towards the container. An X-Ray detector may be disposed opposite the X-Ray source and measure the X-Rays passing through the container. The X-Rays passing through the container may be absorbed or scattered by the container and its contents. The X-Ray source and X-Ray detector may be vertically displaced to measure X-Rays passing through the container at a pre-determined height. In one aspect, the X-Ray source and X-Ray detector may be placed at or below an expected fill level of the container. If the container is underfilled, the X-Ray detector may detect more X-Rays because the fluid fill line is lower than the location of the X-Ray detector. In another aspect, the X-Ray source and X-Ray detector may be placed above the expected fill level of the container. If the container is overfilled, the X-Ray detector may detect fewer X-Rays because the fluid fill line is higher than the location of the X-Ray detector. In one aspect, an output signal from fill detector 272 may be transmitted to control circuit 260. If a container is determined to be overfilled or underfilled, control circuit 260 may transmit a fill-error signal to a container rejection subsystem 280 (discussed further, below). In response, container rejection subsystem 280 may remove the container from conveyor system 105 for analysis.

In one example, as disclosed above, fill detector 272 may be a stand-alone device operating independently of the other components of container fill and inspection system 100. In another example, the functions of fill-detector 272 may be incorporated into fluid leakage detection subsystem 140 (see below, with respect to FIG. 3). As will be disclosed below, fluid leakage detection subsystem 140 may include a container detection system to detect the presence of a container in an inspection zone. In addition to the functions and components disclosed below, the fluid leakage detection subsystem 140 may also include the X-Ray source and X-Ray detector disclosed above. In this example, fluid leakage detection subsystem 140 may also cause the X-Ray source to emit X-Rays when the container is detected by the container detection system, and to detect the X-Rays passing through the container. Further in this example, fluid leakage detection subsystem 140 may transmit container fill information to control circuit 260 to allow an under- or over-filled container to be rejected by a container rejection subsystem (see below).

Fluid leakage detection subsystem 140 may be disposed downstream of fill detector 272. As illustrated in FIG. 2, fluid leakage detection subsystem 140 may be composed of an inspection head 242 supported by a mounting system 248. Mounting system 248 may comprise a vertically adjustable pole mount to support inspection head 242. Mounting system 248 may be configured to per adjustment of an axial displacement (x, y, z) and/or a rotational displacement (roll, pitch, yaw) of inspection head 242 relative to axes defining conveyor system 105. Additional disclosures regarding fluid leakage detection subsystem 140 and inspection head 242 are presented below. Additional disclosure of fluid leakage detection subsystem 140 is present below in the discussion of FIG. 3.

A motion measurement device 250 may be associate with conveyor system 105 to measure a position of a container as it passes through the detection zone of leakage detection subsystem 140. Motion measurement device 250 may provide an output signal related to the position of the container. As the motor shaft rotates, conveyor system 105 transports the container through fluid leakage detection subsystem 140. A measurement of the motor shaft rotation may be related to a linear motion of conveyor system 105. As a result, the measurement of the motor shaft rotation may be correlated with a position of the container in fluid leakage detection subsystem 140. As one example, motion measurement device 250 may be an encoder associated with the shaft of a motor used to drive conveyor system 105. Non-limiting examples of an encoder may include an absolute rotary encoder or an incremental rotary encoder.

FIG. 2 also depicts a container rejection subsystem 280 which may be located downstream of fluid leakage detection subsystem 140. Container rejection subsystem 280 may be deployed to remove a container that does not meet leakage criteria determined by fluid leakage detection subsystem 140 from conveyor system 105. In one example, container rejection subsystem 280 may include a first pneumatic system that may include a large pad connected to a piston. In one example, the pad may be sized to be large with respect to the container size in order not to deform the container. The piston may be controlled pneumatically via a 2-way valve and an air supply. When a leakage measure value of a container is found to be outside of the accepted leakage measure range, the leakage rejection subsystem 280 may receive a rejection signal that opens the valve causing the rejector pad to extend. When there is no rejection signal, the 2-way valve changes to resting position which changes the air pressure to suck in the rejector pad. In a second example, container rejection subsystem 280 may include a segmented rejector. The segmented rejector may have some number of individually actuatable segments (such as 8 segments), with each successive segment slightly longer than the last. These segments may be deployed in sequence to gently divert the container off conveyor system 105. The segments may also be controlled pneumatically and timed to only affect the leaking container. Container rejection subsystem 280 may remove a container having a leakage measure outside of the pre-determined leakage measure range. In one aspect, containers removed by container rejection subsystem 280 may be separately inspected to determine any flaws in the paperboard packaging material. Data related to the rejected container, such as a lot number associated with the paperboard packaging material, or inspection data generated by fluid leakage detection subsystem 140, may be archived for future use.

FIG. 2 also depicts a control circuit 260 that may be electrically connected to any one or more of fill detector 272, fluid leakage detection subsystem 140, motion measurement device 250, and container rejection subsystem 280. In one aspect, a control circuit 260 may execute one or more algorithms that calculate a container leakage measure. A container may be considered to have no leaks if the container leakage measure is within a pre-determined leakage measure range. Control circuit 260 may determine a container leakage measure for each container passing through an inspection zone defined by inspection head 242. When a container has a leakage measure value within an acceptable leakage measure range, the container may proceed along conveyor system 105. However, if a container has a leakage measure value outside of the acceptable leakage measure range (that is, demonstrates some leakage characteristic) control circuit 260 may transmit a rejection signal to container rejection subsystem 280. In response to the receipt of the rejection signal, container rejection subsystem 280 may divert the container off conveyor system 105 to be discarded or analyzed further. Control circuit 260 may time the transmission of the rejection signal until the leaking container is present at container rejection subsystem 280.

In one aspect, control circuit 260 may receive data from inspection head 242 to characterize aspects of a container passing therethrough. Control circuit 260 may also receive data from fill detector 272 characterizing an amount of fluid in a container. Additionally, control circuit 260 may receive data from conveyor system 105 indicating a speed and/or location of one or more containers moving along conveyor system 105. Additionally, control circuit 260 may provide information to container rejection subsystem 280 to instruct container rejection subsystem 280 to divert a container that does not meet one or more leakage or fill metrics from conveyor system 105. In one aspect, control circuit 260 may receive data from an operator to adjust one or more parameters to control any one or more subsystems of inspection system 100.

The terms "control circuit," "controller," and "control subsystem" are substitutable with each other and encompass hardwired circuitry, programmable logic (such as microprocessors, microcontrollers, digital signal processors (DSPs), programmable logic devices (PLDs), programmable gate arrays (PGAs), or field-programmable gate arrays (FPGAs)), state machines, or firmware that executes stored instructions. Control circuits may form part of larger systems, such as integrated circuits (ICs), application-specific integrated circuits (ASICs), or systems-on-chips (SoCs), and may be found in devices such as computers, smartphones, wearable devices, and servers. These circuits may perform tasks involving data processing, communication, or data storage. Depicted components, functions, or operations may be implemented using hardware, software, firmware, or combinations of two or more thereof.

Instructions for implementing system features can be stored in various types of memory. Suitable memory circuits may include dynamic random-access memory (DRAM), flash memory, and/or cache. These instructions can be distributed over a network or via other computer-readable media. The term "non-transitory computer-readable medium" refers to any physical medium capable of storing or transmitting instructions or information that can be read by a machine. Examples of suitable media include RAM, ROM, EPROM, EEPROM, magnetic or optical media, flash memory, or even propagated signals such as carrier waves or infrared signals.

Control circuits may also include one or more interfaces capable of transmitting and receiving data such as electrical signals from other electrical devices, such as sensors or other control circuits. Control circuits may further include interfaces for use by a user, either to receive data from the user or provide information to the user. Data provided to the user may be provided in various formats, non-limiting examples being visual data, auditory data, haptic data, and the like. Non-limiting examples of devices to present data to a user may include a visual display device and an auditory device. Data received from the user may be provided through any number of user interface devices, non-limiting examples being keyboards, hand operated devices (mouse, joystick), and voice operated devices (microphone).

Figure 3:
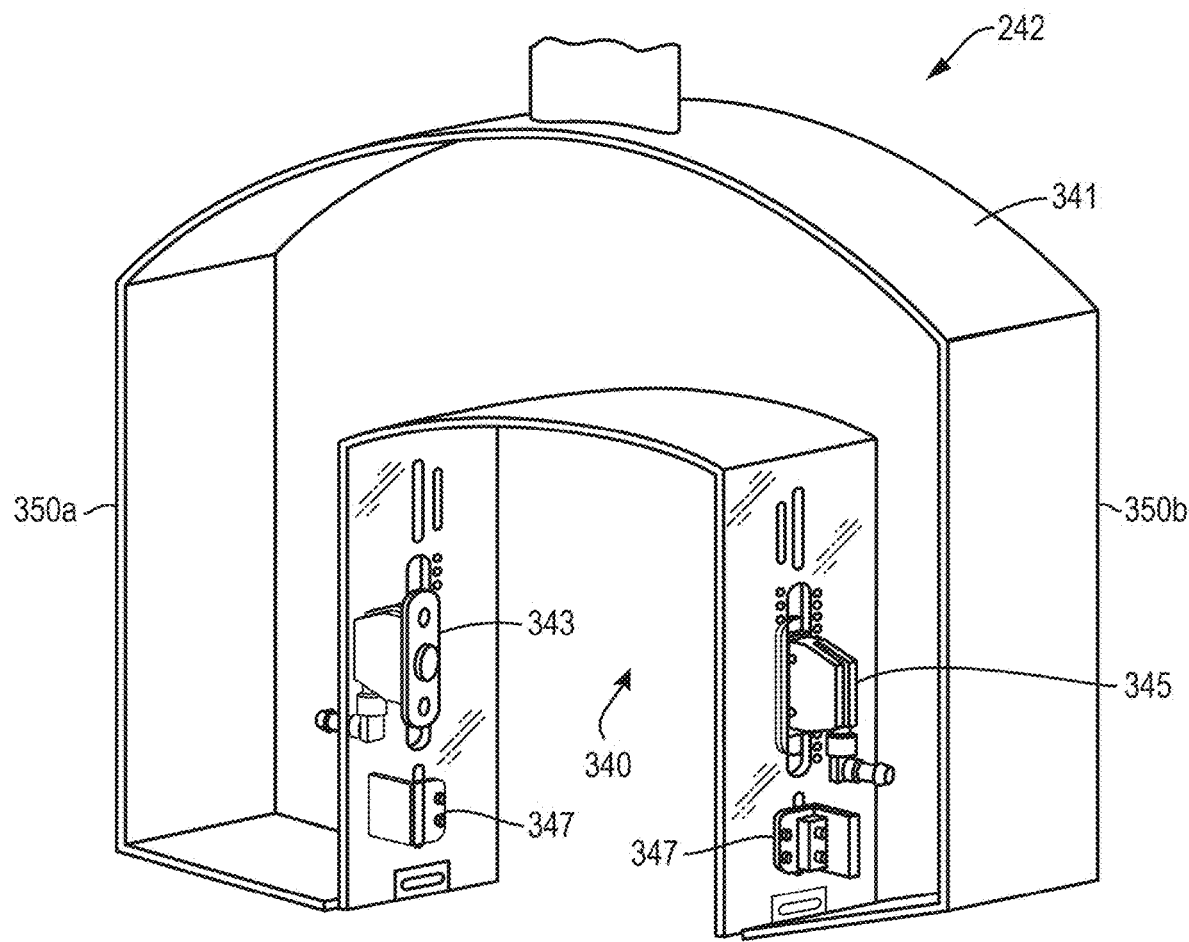
FIG. 3 is a partial cut-away view of an inspection head according to one aspect of the present disclosure.

FIG. 3 illustrates one example of a partial cut-away view of an inspection head 242. Inspection head 242 may include mechanical and electrical components to measure characteristics of a containing passing therethrough. Inspection head 242 may be composed of two portions, a first portion 350a and a second portion 350b that may be vertically disposed opposite each other, thereby defining an inspection zone 340 therebetween. During use, portions 350a,b may be placed on opposite sides of a conveyor system so that the conveyor system, and containers transported thereon, pass through inspection zone 340.

Portions 350a,b may be disposed within a housing 341 that may cover and protect portions 350a,b from moisture or other environmental components. In one aspect, housing 341 may form an arch or dome shape above portions 350a,b to prevent water or other fluids from accumulating on, in, or about inspection head 242. Housing 341 may further include one or more slits or openings at the bottom to allow any water therein to drain from interior locations within housing 341. In one example, housing 341 may be light tight except at a few defined locations. Housing 341 may be fabricated of any suitable material such as a metal or plastic sheet.

Each of first portion 350a and second portion 350b may include one or more components to serve as a container detection system 347. Container detection system 347 may detect a presence of a container within or traversing through inspection zone 340. In one non-limiting example, container detection system 347 may include a light-beam interrupt detection system. In this example, a light emitting component may be disposed in one portion (either 350a or 350b) and configured to emit light through inspection zone 340. A light receiving component may be disposed in an opposing portion (either 350b or 350a, respectively) and configured to receive the emitted light passing through inspection zone 340. A container located within or traversing inspection zone 340 may interrupt the light emitted by the light emitting component, and thus its presence in inspection zone 340 may be detected. An output signal from container detection system 347 may be received by a control circuit (see FIG. 2, control circuit 260). In one aspect, the components of container detection system 347 may be disposed on a lower section of portions 350a,b thereby being proximal to the conveyor system. Such a position may permit container detection system 347 to detect a presence of a lower portion of a container within inspection zone 340. In an alternative aspect, the components of container detection system 347 may be disposed on an upper section of portions 350a,b thereby being distal to the conveyor system. Such a position may permit container detection system 347 to detect a presence of an upper portion of a container within inspection zone 340. The components of container detection system 347 may be vertically and/or horizontally adjustable within portions 340a,b. The components of container detection system 347 may be located within portions 350a,b based on a size or shape of a container being inspected, and/or locations of container sensors 343 within portions 350a,b (see below).

Each of first portion 350a and second portion 350b may include one or more container sensors 343. Container sensors 343 may be disposed opposite each other across inspection zone 340. In one non-limiting example, each container sensor 343 may be a laser ranging sensor. In another non-limiting example, each container sensor 343 may be a proximity sensor. In one aspect, each container sensor 343 may be mounted on a container sensor carriage 345 in each respective portion 350a,b. Each of container sensor carriages 345 may be vertically and/or horizontally adjustable within portions 340a,b. Each container sensor carriage 345 may be located within portions 350a,b based on a size or shape of a container being inspected. The components of container detection system 347 may be located above or below container sensors 343.

Container sensors 343 may provide an output sensor signal to control circuit 260 (see FIG. 2) which may include instructions to determine one or more leakage merit values related to the container scanned by container sensors 343. In one example, the output sensor signal may be a digital signal. In an alternative example, the output sensor signal may be an analog signal. The analog signal may be conditioned (for example, amplified or filtered) before being converted to a digital signal, for example by an Analog-to-Digital Converter (ADC) by control circuit 260. The ADC may have any appropriate resolution depending on the analog signal produced by container sensors 343. In a non-limiting example, the ADC may have a 12 bit ($2^{12}$) resolution, although any suitable resolution may be used. Additionally, the ADC output value may be scaled or normalized to an appropriate value by control circuit 260. The ADC output may be normalized to provide a consistent analysis of the containers, as disclosed below. In one aspect, control circuit 260 may acquire and convert the output sensor signal based on a pre-defined number of changes or transitions of motion measurement device 250 (see FIG. 2).

Figure 4:
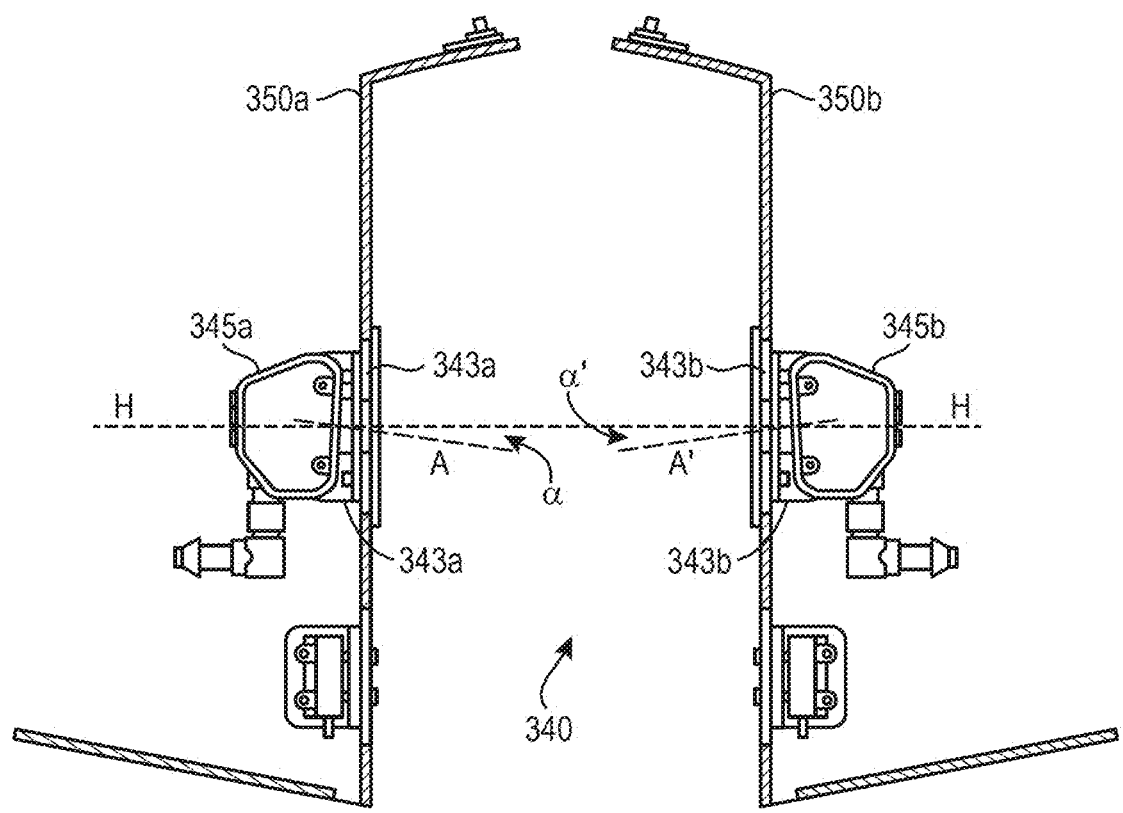
FIG. 4 is a side view of container sensors mounted on container sensor carriages according to one aspect of the present disclosure.

FIG. 4 illustrates the disposition of a pair of container sensors 343a and 343b, disposed in respective portions 350a and 350b of inspection head 242 (see FIG. 2). Each container sensor 343a and 343b is mounted on a container sensor carriage 345a and 345b, respectively. Each container sensor 343a,b may include a container sensor surface directed towards inspection zone 340. Each container sensor surface may have a sensor surface center. A horizontal axis H may be defined by a sensor surface center of a container sensor 343a disposed in first portion 350a and a sensor surface center of a container sensor 343b disposed in second portion 350b. A container sensor axis may be defined by an axis normal to the sensor surface center for each container sensor 343a and 343b. Container sensor axes are depicted as A and A' for container sensors 343a and 343b, respectively, in FIG. 4.

In one aspect, container sensors 343a and 343b may be laser ranging sensors. Laser ranging sensors emit radiation (for example a laser beam having a wavelength of about 655 nm, although any suitable laser wavelength may be used. The emitted radiation may be backscattered by a surface of a container, and the backscatter may be detected by a photosensor of the laser ranging sensor. The surface of the container may be measured by the laser ranging sensor based on a time-of-flight of the emitted and backscattered radiation. If two laser ranging sensors are focused on opposing surfaces of the container, a measurement of the surface profile of the opposing surfaces of the container may be measured as the container traverses inspection zone 340. However, if there is no container between the opposing laser ranging sensors, the emitted radiation from each laser ranging sensor may impinge on the photosensor of the opposite laser ranging sensor. This effect may be unwanted. In one aspect, container sensors 343a and 343b may be disposed so that their respective sensor axes A and A' are not co-axial with horizonal axis H. In a further example, container sensor axes A and A' may be directed away from horizontal axis H by a non-zero deflection angle $\alpha$, $\alpha'$ to prevent potential blinding of the opposite laser ranging sensor. In one aspect deflection angle $\alpha$, $\alpha'$ may be within the range of about 3° to about 10°. In one example, deflection angle $\alpha$, $\alpha'$ may be about 3°. Deflection angle $\alpha$, $\alpha'$ may be vertical, horizontal, or any other rotational angle with respect to horizontal axis H.

Container sensors 343a and 343b may be mounted on container sensor carriages 345a,b, respectively. Container sensor carriages 345a,b may be mounted on vertical struts within portions 350a,b, respectively, of fill detector 242. Container sensor carriages 345a,b may be adjustable in both deflection angle $\alpha$, $\alpha'$. Thus, first container sensor carriage 345a may be configured to direct first container sensor axis A at a non-zero angle (deflection angle $\alpha$) with respect to the horizontal axis H, and second container sensor carriage 345b may be configured to direct second container sensor axis A' at a non-zero angle (deflection angle $\alpha'$) with respect to horizontal axis H. Additionally, container sensor carriages 345a,b may permit adjustable vertical positioning of container sensors 343a,b on the vertical struts.

Figure 5:
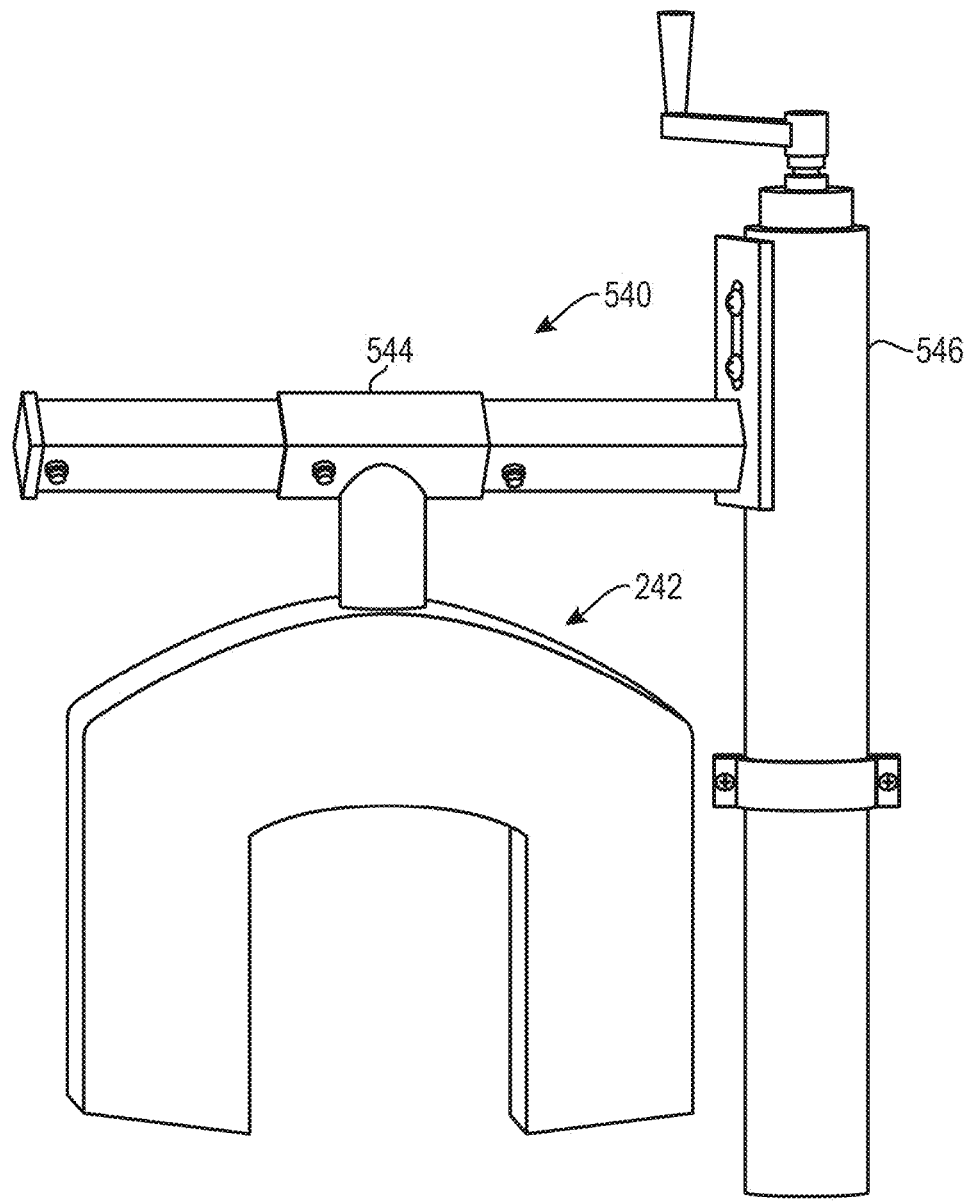
FIG. 5 is a perspective view of an inspection head including a mounting system according to one aspect of the present disclosure.

FIG. 5 illustrates an inspection head 242 including a mounting system 540. The mounting system may generally permit positioning of inspection head 242 with respect to the conveyor system. Mounting system 540 may permit axial displacement of inspection head 242 so that the conveyor system allows containers to traverse the inspection zone of inspection head 242. Mounting system 540 may also permit rotational displacement of inspection head 242 with respect to a longitudinal axis of the conveyor system so that the longitudinal axis of the conveyor system is effectively orthogonal to horizontal axis H of the container sensors (see FIG. 4). In one non-limiting example, mounting system 540 may be composed of a vertically adjustable pole mount 546 having a horizontal inspection head support 544.

As depicted in FIG. 2, a container inspection system may include one or more of fill detector 272, fluid leakage detection subsystem 140, motion measurement device 250, and container rejection subsystem 280, all of which may be electrically connected to control circuit 260. In general, conveyor system 105 may transport a container through the inspection zone of inspection head 242. Control circuit 260 may receive detection data from a container detection system disposed in inspection head 242. Based on the detection data, control circuit 260 may determine that the container has entered the inspection zone. Control circuit 260 may track the passage of the container through the inspection zone based on data received from motion measurement device 250. Control circuit 260 may further receive first container sensor data from the first container sensor and receive second container sensor data from the second container sensor while the container traverses the inspection zone. Control circuit 260 may further characterize a feature of the container based at least in part on the first container sensor data and the second container sensor data. Additionally, control circuit 260 may determine a leakage measure of the container based at least in part on the characterized feature. In one aspect, control circuit 260 may determine that the leakage measure of a container may be outside of a predetermine leakage measure range. If the leakage measure of the container is outside of the predetermine leakage measure range, control circuit 260 may send a control signal to container rejection subsystem 280 causing the container to be rejected from the conveyor system 105.

Figure 6A:
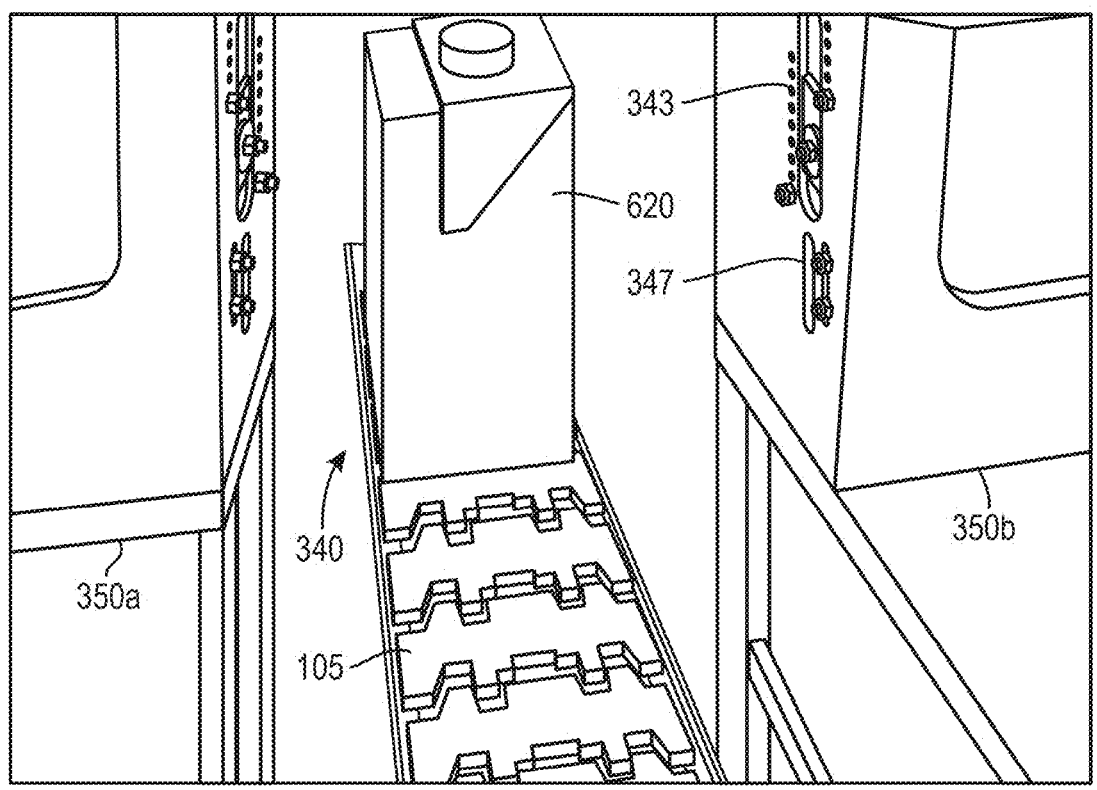
FIG. 6A is a perspective view of a container traversing an inspection head according to one aspect of the present disclosure.

FIG. 6A is an illustration of a contain 620 traversing inspection zone 340 of an inspection head. First portion 350a and second portion 350b are depicted defining inspection zone 340. Container 620 traverses inspection zone 340 by means of conveyor system 105 on which it is placed. FIG. 6A also depicts container detection system 347 disposed in second portion 350b and which is configured to detect a presence of container 620 within inspection zone 340. FIG. 6A also depicts container sensor 343 disposed in second portion 350b, and which is configured to measure a characteristic of a surface of container 620. Complementary components of a container detection system and a second container sensor may be disposed in first portion 350a. In some examples, components of container detection system may be set vertically below the container sensors. Alternatively, components of container detection system may be set vertically above the container sensors. In one example, the components of container detection system may be set about ½ inch (about 1.3 cm) above conveyor system 105. Conveyor system 105 may operate at any suitable speed to transport the containers through the container inspection head. In an example of a container sensor based on a laser ranging device, the laser response may be on the order of 200 μsecs. to about tens of msecs. This response may permit an inspection rate of about 2000 containers per minute.

Figure 6B:
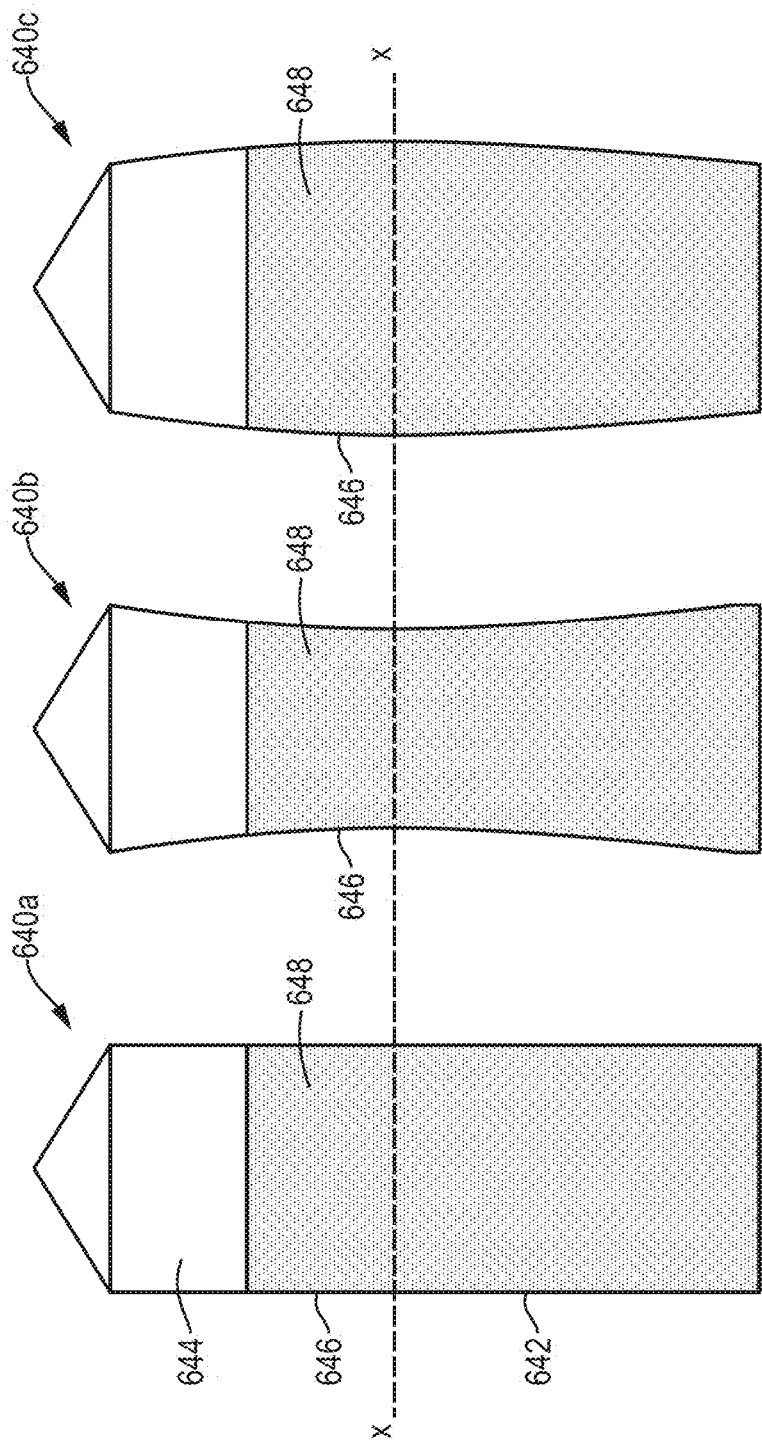
FIG. 6B illustrates various containers according to one aspect of the present disclosure.

FIG. 6B illustrates some exemplary containers 640a,b,c which may traverse a conveyor system. Containers 640a,b,c may include a fluid filled zone 642 and an air filled zone (or ullage zone) 644 above fluid filled zone 642. Typically, the container is filled either with a hot fluid, or steam flushed before filling. The heated container may be sealed after filling. This may result in the container having bulges in its side walls (for example, side walls 646 and 648). The container may cool while being transported from the filling station to the fluid inspection subsystem. When the fluid and air cool within the container, they may contract, resulting in sealed containers having approximately straight sidewalls (646, 648), as illustrated as non-leaking container 640a. If a fluid leak occurs after container 640b is sealed, the loss of fluid volume may create a partial vacuum within container 640b, resulting in side walls 646, 648 collapsing, thus creating concave surfaces. Alternatively, if an air leak occurs after container 640b is sealed, the contracting air and fluid may draw air in through the leakage site, so that the bulge in container 640c is retained, thus creating convex surfaces.

Figure 7:
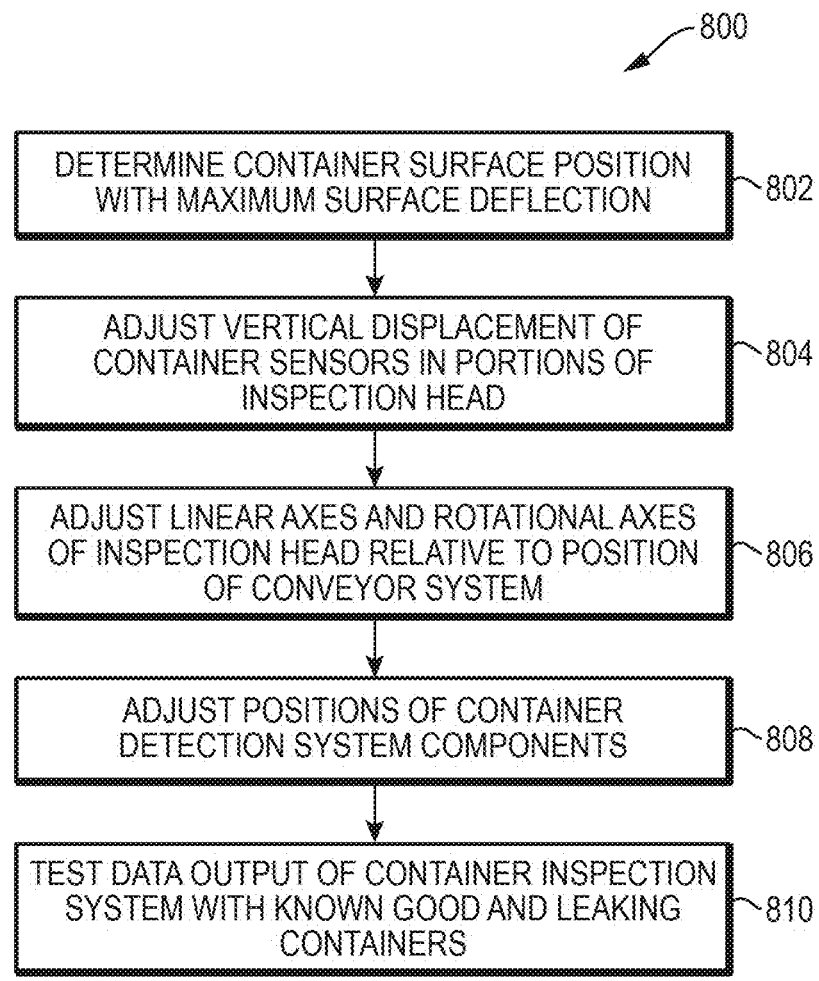
FIG. 7 is a flow chart of a method for installing a container leakage detector on a container fill line according to one aspect of the present disclosure.

Once the container inspection head is properly installed about the conveyor system, the various sensors may be positioned for detecting and measuring the containers. FIG. 7 is a flow-chart 800 for adjusting the various sensors.

The method may include determining 802 container surface positions having maximum surface deflection. This step may be accomplished by using test containers sealed under pressure (modeling a container having an air leak, see FIG. 6B 640*c*) or under vacuum (modeling a container having a fluid leak, see FIG. 6B 640*b*).

The method may also include adjusting 804 the vertical displacement of container sensors in the vertical portions of the container inspection head. In particular, the container sensors may be vertically adjusted so that their emissions may impinge on the container surfaces demonstrating the maximum surface deflection of the surfaces. In one aspect, the adjustment of the position of the container sensors may be done by adjusting the container sensor carriages vertically along contain sensor carriage rails in the container inspection head and then fine-tuned via the vertically adjustable pole mount.

The method may further include adjusting 806 the linear axes and rotational axes of the container inspection head relative to position of conveyor system. The container inspection system may be installed on a pre-exiting conveyor system. In particular, the container inspection head may be properly placed and oriented to optimize the detection of the container carried by the conveyor system. An optimized placement and orientation of the container inspection head may provide consistent and accurate determination of the leakage characteristics of the containers passing therethrough. In particular, an optimized placement and orientation may minimize the number of non-leaking containers classified as leaking containers, and leaking containers classified as non-leaking containers. In this context, optimized placement and orientation may refer to a placement and orientation of the container inspection head relative to the conveyor system so that: (1) the container detection system is triggered when a container first enters the inspection zone and determines when the container leaves the inspection zone; (2) the conveyor system bisects the inspection zone (that is, is equidistant from the first portion of the container inspection head and the second portion of the container inspection head); (3) vertical axes defining the first portion and the second portion of the container inspection head may be orthogonal to a plane defined by the conveyor system; and (4) the path of the conveyor system within the inspection zone is orthogonal to a plane defined by the first portion of the inspection head and the second portion of the inspection head.

When the container inspection head is properly aligned with the conveyor system, the method may further include adjusting 808 the positions of container detection system components to detect when the container is positioned within the inspection zone. The method may also include testing 810 data output of the container inspection system with known good and leaking containers.

Figure 8:
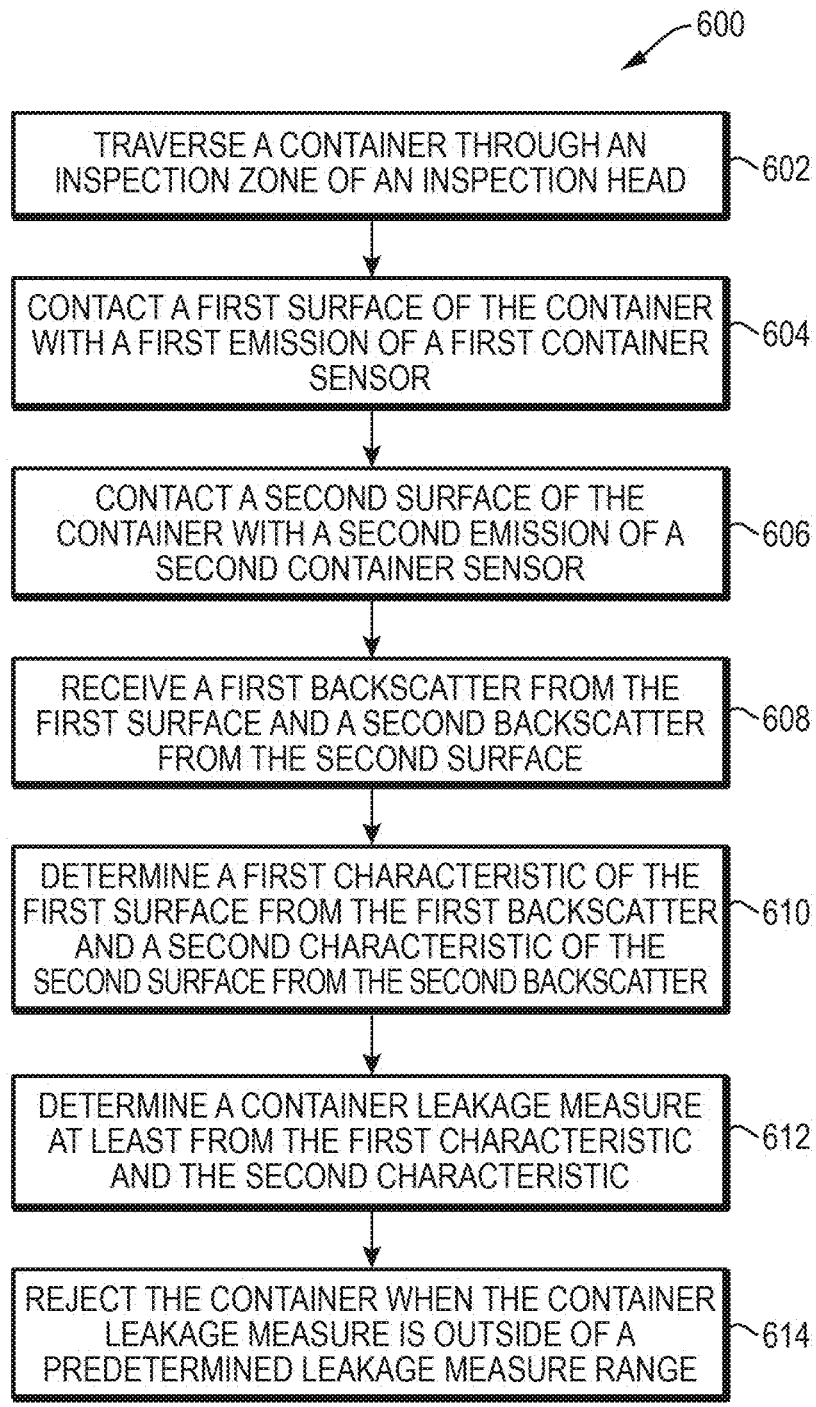
FIG. 8 is a flow chart of a method of inspecting filled and sealed containers for leaks according to one aspect of the present disclosure.

FIG. 8 is a flow chart 600 of a method of inspecting filled and sealed containers for leaks. In one aspect, the method may include traversing 602 a container through an inspection zone of a container inspection head. The container may be transported by a conveyor system through the inspection zone. In one aspect, the method may also include detecting the container once it enters the inspection zone, as disclosed above with respect to the detection system disposed within the container inspection head. The method may further include contacting 604 a first surface of the container with a first emission of a first container sensor and contacting 606 a second surface of the container with a second emission of a second container sensor. In one example, the first and second container sensors may be laser ranging sensors and the emission may be a laser light emission. In an alternative example, the first and second container sensors may be ultrasound sensors and the emission may be an ultrasound pressure emission. In one example, the method may include receiving 608 a first backscatter from the first surface and a second backscatter from the second surface. The method may additionally include determining 610 a first characteristic of the first surface from the first backscatter and a second characteristic of the second surface from the second backscatter. In one aspect, the first characteristic of the first surface and the second characteristic of the second surface may include a surface curvature of one or more surfaces of the container. As a non-limiting example, determining the first characteristic of the first surface may include determining a first surface curvature of the first surface, and determining the second characteristic of the second surface may include determining a second surface curvature of the second surface. The method may further include determining 612 a container leakage measure at least from the first characteristic and the second characteristic. Additionally, the method may include rejecting 614 the container when the container leakage measure is outside of a predetermined leakage measure range.

As disclosed above, once a container enters the inspection zone, the container detection system may be activated, and a detection signal may be transmitted to the control circuit. The control circuit may begin acquiring scanning data from the container sensors upon receipt of the detection signal, and cease acquiring scanning data from the container sensors when the detection signal indicates that the container has exited the inspection zone. The scanning data may be in the form of an electrical signal which may be conditioned as required (for example noise filtering, signal amplification, and similar). At the same time, the control circuit may receive container positioning data from the motion measurement device. In one example, the control circuit may acquire each scanning datum point after a predetermined number of changes in the container positioning data. In another example, a length of the container may be measured in terms of a number of changes in the container positioning data (for example, a length of a container may correspond to 512 changes in the container positioning data). The control circuit may acquire a predetermined number of scanning data points (for example 256 scanning data points) thereby normalizing the predetermined number of acquired scanning data points to the length of the container.

Figure 9:
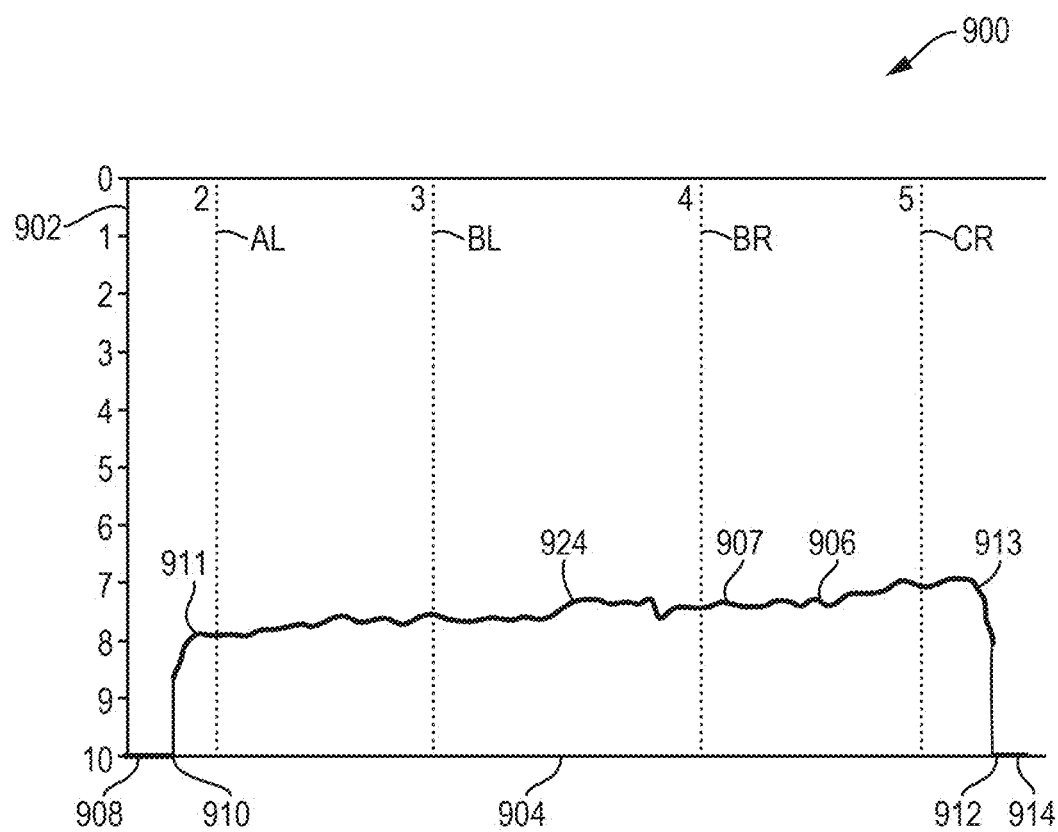
FIG. 9 is an exemplary graph of data output from a leakage detection system according to one aspect of the present disclosure.

FIG. 9 illustrates an exemplary graph 900 of scanning data for a single side of a container. Graph 900 may have an ordinate 902 related to values of the container sensor data points. In one aspect, the values of ordinate 902 may represent values of the container sensor data that are normalized to a pre-determined value. The values of the container sensor data points may be related to a distance of a portion of a container surface from the container sensor. This distance may be related to a displacement of a portion of the actual container surface from a theoretically flat container surface. In some additional examples, the ordinate values may be used to calculate leakage measure or merit values related to the curvature of the surfaces of the container. Graph 900 may have an abscissa 904 that may be related to the value of the container positioning data. The container positioning data may either refer to a physical location along the container surface, or a time at which the scanning data points are acquired. A container side profile 906 may illustrate a container surface profile over the length of the measured surface. Container side profile 906 may be obtained from the container sensor data as the container traverses past the container sensor. Container side profile 906 may be characterized by endpoints and a surface profile 907. A leading endpoint 908 may include data from the container sensors before a container is probed by the container sensors. Leading edge 910 may indicate the starting point at which the container sensors probe a surface of the container. Leading surface corner 911 may indicate a start of the container surface profile 907. Physically, leading edge 910 may correspond to a first portion of the container measured by the container sensors. Since the container may be presented at an angle to the container sensors, leading edge 910 may not correspond to the physical start of the container surface being measured. Leading surface corner 911 may be associated with a beginning of a first surface probed by the container sensors. Trailing edge 912 may indicate the ending point at which the container sensors probe the surface of the container. Trailing surface corner 913 may indicate an end of the container surface profile 907. Physically, trailing edge 912 may correspond to an end portion of the container measured by the container sensors. Since the container may be presented at an angle to the container sensors, trailing edge 912 may not correspond to the physical end of the container surface being measured. Trailing surface corner 913 may be associated with an end of the first surface probed by the container sensors. A trailing endpoint 914 may include data from the container sensors after the container is probed by the container sensors.

Markers AL, BL, BR, and CR may be used to delimit portions of container side profile 906. Markers AL and CR may delimit container side profile 906 to a portion that may be analyzed for surface curvature while avoiding any artifacts induced by leading edge 910 and trailing edge 912 of the container. In one example, a length of the container surface (a distance between leading edge 910 and trailing edge 912) may be normalized to a number of steps or changes in the output of the motion measurement device.

Markers AL and CR may be chosen as a percent along the length of the container surface. In one example, a predetermined number of non-leaking containers (in a non-limiting example, 25) may be scanned and their respective container side profiles 906 may be measured by a user of the inspection system and the user may determine a best placement of AL and CR based on the measured data.

After AL and CR are determined, a midpoint 924 of container side profile 906 may be determined based on the locations of AL and CR. Markers BL and BR may be chosen to be equidistant from midpoint 924. Markers BL and BR may define a central portion of container side profile 906 for surface curvature analysis. In some non-limiting examples, the distance between BL and BR may represent about 10% of the total length between AL and CR. In other non-limiting examples, the distance between BL and BR may be greater than 10% or less than 10% of the distance between AL and CR. For example, the distance between BL and BR may be less than 10% for container surfaces that are generally smoothly continuous between BL and BR. Alternatively, the distance between BL and BR may be greater than 10% for container surfaces that may demonstrate a more corrugated surface between BL and BR. In some examples, a user may review container side profiles 906 generated by a predetermined number (for example 25) of known non-leaking containers and determine the placement of the BL and BR markers.

Figure 10:
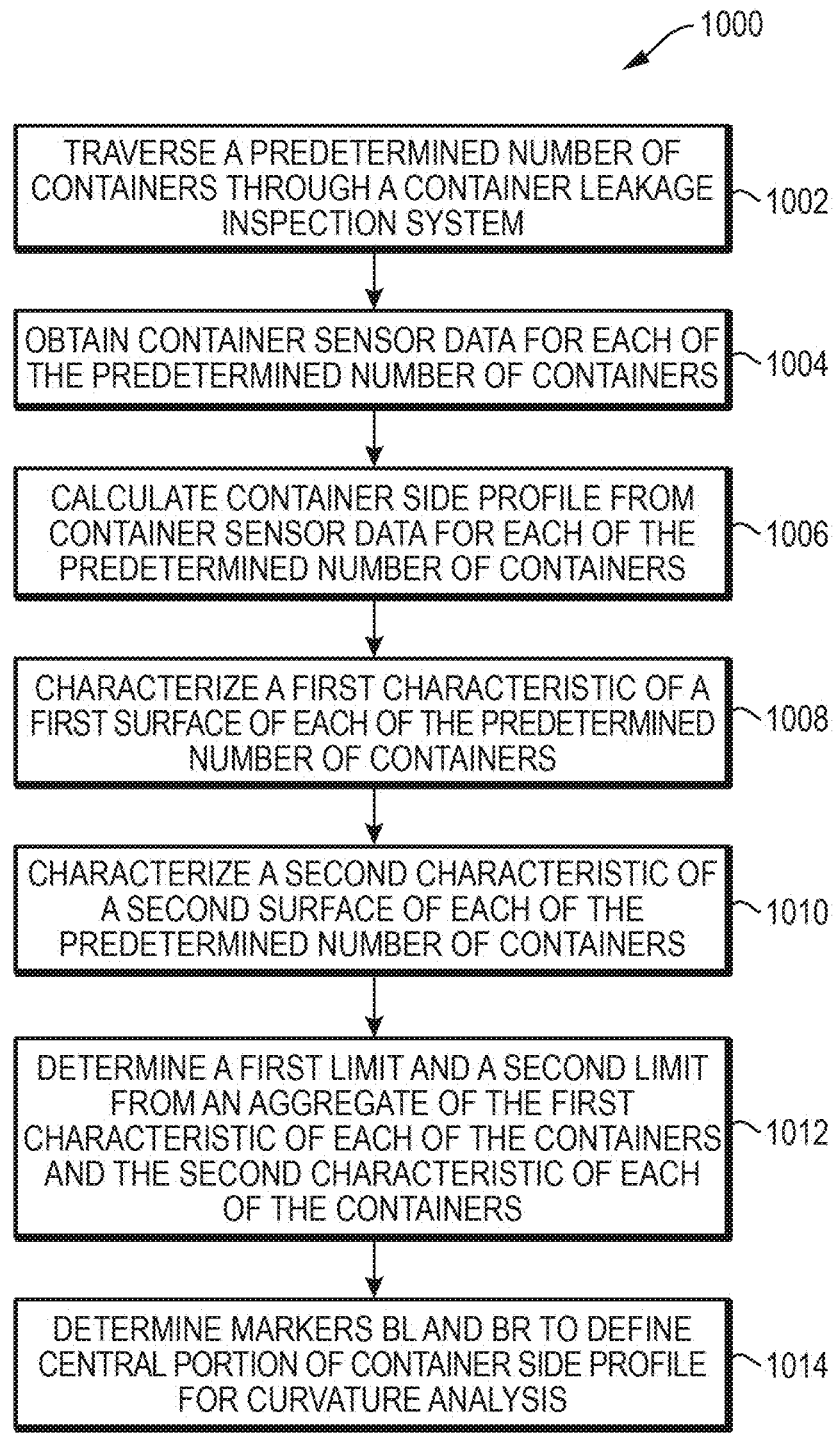
FIG. 10 is a flow chart of a method of determining algorithmic parameters of a leakage detection system according to one aspect of the present disclosure.

FIG. 10 is a flow chart 1000 of a method of determining algorithmic parameters of a leakage detection system for a predetermined number of containers. In one aspect, a predetermined number of known non-leaking containers may be chosen. In another aspect, a predetermined number of known leaking containers may be chosen. In one example, model known leaking containers may be fabricated by sealing containers under vacuum, thereby inducing concave surfaces in the containers (modeling containers having fluid leaks). In another example, model known leaking containers may be fabricated by sealing containers under pressure, thereby inducing convex surfaces in the containers (modeling containers having air leaks). Each of the predetermined number of containers may traverse 1002 a container leak inspection system. For each of the predetermined number of containers, sensor data may be obtained 1004. For each of the predetermined number of containers, a container side profile may be calculated 1006 from the container sensor data. In one aspect, the side profile abscissa for each container may be normalized to a predetermined number of data points. A first characteristic may be characterized 1008 for a first surface of each of the predetermined number of containers. A second characteristic may be characterized 1010 for a second surface of each of the predetermined number of containers. First and second characteristics may include a leading endpoint, a trailing endpoint, a leading edge, and a trailing edge for each surface. A first limit and a second limit may be determined 1012 from an aggregate of the first characteristic of each of the containers and the second characteristic of each of the containers. For example, from the aggregate container side profiles of all of the sampled containers, delimiting markers AL and CR may be determined. Delimiting markers BL and BR may be determined 1014 to define a portion of the container side profiles to analyze for curvature.

Figure 11:
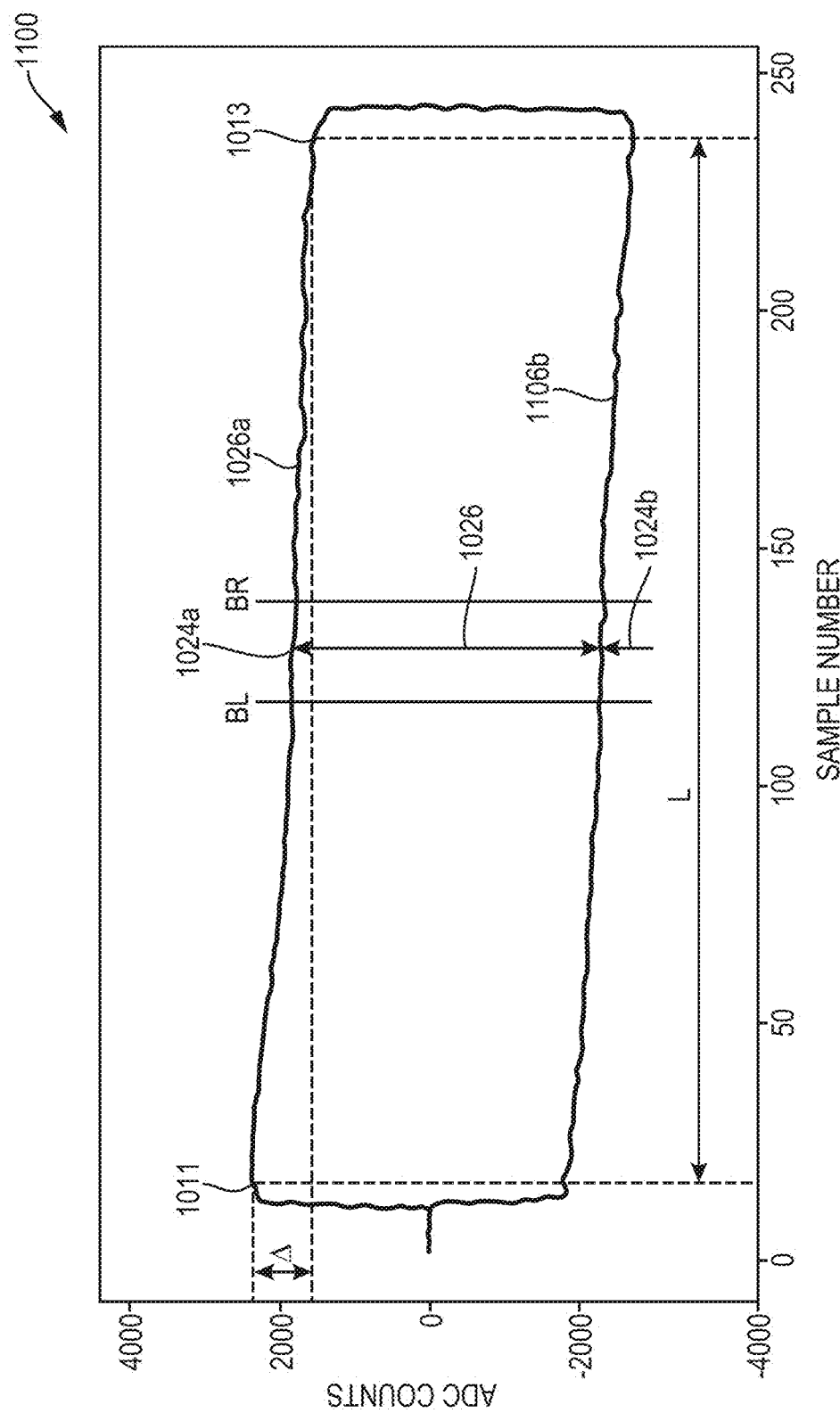
FIG. 11 is a graph of a method for determining a container cross section merit value according to one aspect of the present disclosure.

FIG. 11 illustrates a graph 1100 related to a first type of leakage measure or merit value related to curvature of container surfaces. Referring to FIG. 9, container side profile 906 may refer to the container sensor data representing one surface of a container traversing the container sensors. In FIG. 11, container side profiles 1106a and 1106b are presented, representing measurements of opposing sides of the container. Delimiting markers BL and BR, that were previously determined (see flow chart at FIG. 10) for a similarly sized and dimensioned container, may be applied to container side profiles 1106a,b. The container sensor values of first container side profile 1106a may be averaged between delimiters BL and BR, providing a first average sensor value at midpoint 1024a. Similarly, the container sensor values of second container side profile 1106b may be averaged between delimiters BL and BR, providing a second average sensor value at midpoint 1024b. A difference 1026 may be calculated between the first average sensor value and the second average sensor value, and the results may be divided by 2. These calculations may result in a leakage measure or merit value based on a cross-sectional measurement of the container.

Another leakage measure may be obtained from the container side profile of each of the opposing surfaces. Returning to FIG. 9, each container side profile may have a shape such as depicted by container side profile 906 in FIG. 9. Again, an average sensor value may be calculated between limits BL and BR for each container side profile. The two average values may be added together, and an offset related to a container demonstrating no side surface curvature may be subtracted from the result. These calculations may result in a leakage measure or merit value based on a difference from values taken from a leak-free container.

Another leakage measure may be determined according to a measurement related to a curvature of a side of a container. In some examples, a container traversing an inspection head may not have a horizontal axis parallel to a direction of travel of the conveyor system. As a result, the container side profile may demonstrate an angle to the direction of travel. Returning to FIG. 11, container side profile 1106a is not effectively horizontal with respect to the abscissa (indicating travel distance through the container sensors). In order to analyze side curvature of the container, it may be necessary to rotate the container side profile 1106a. Leading surface corner 1011 differs from trailing surface corner 1013 by a difference value Δ. Difference value Δ, along with a calculated length of the container L, may be used to calculate a rotation factor which may be applied to container side profiles 1106a,b to result in effectively horizontal sides.

Figure 12A:
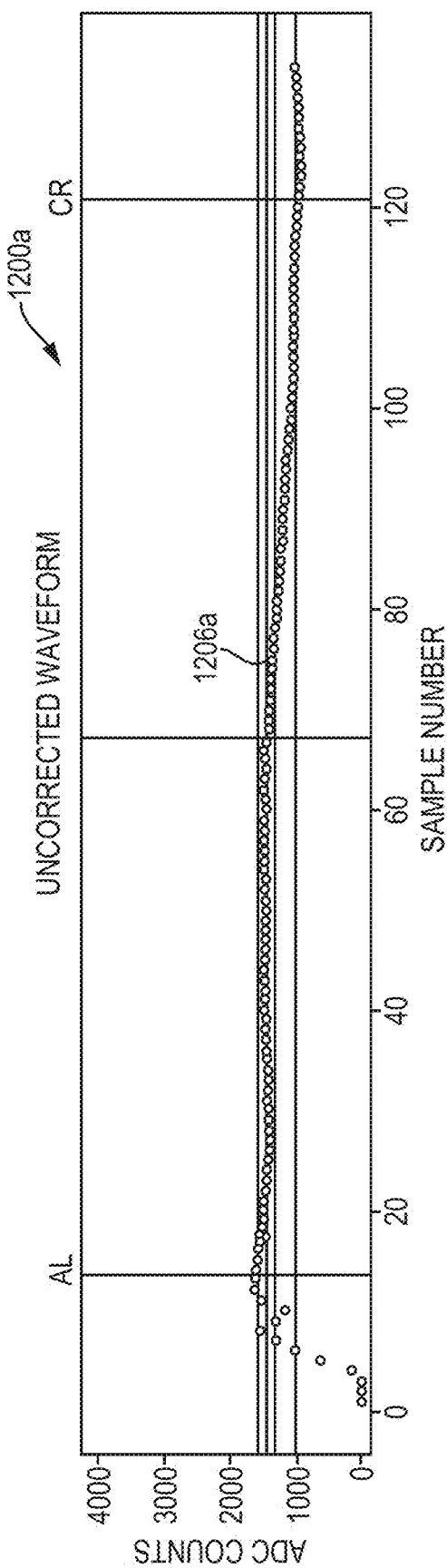
FIGS. 12A-12C depict graphical data used in a container contour calculation algorithm according to one aspect of the present disclosure.
Figure 12B:
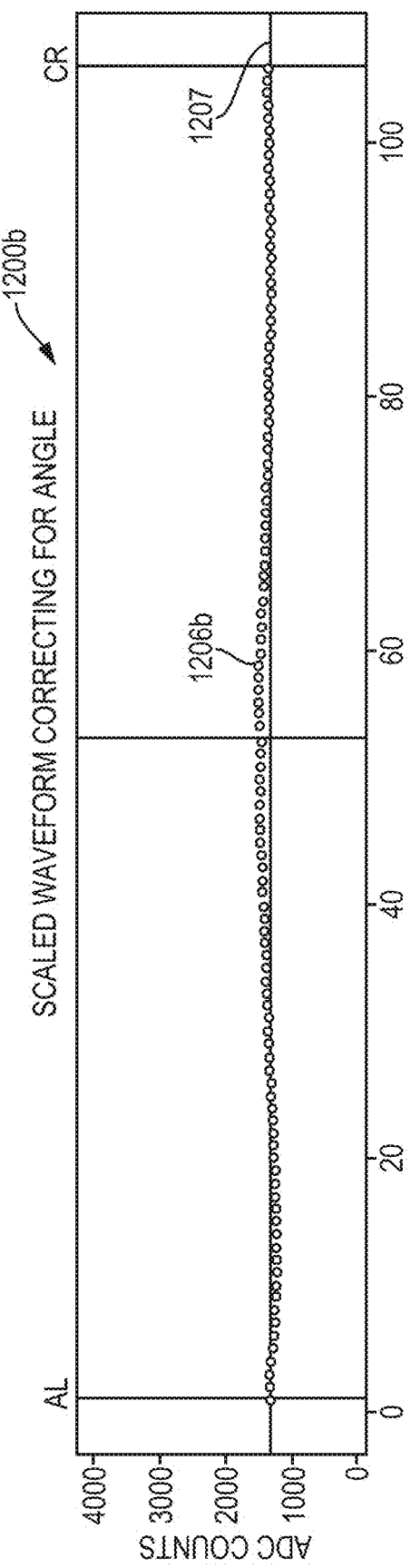
Figure 12C:
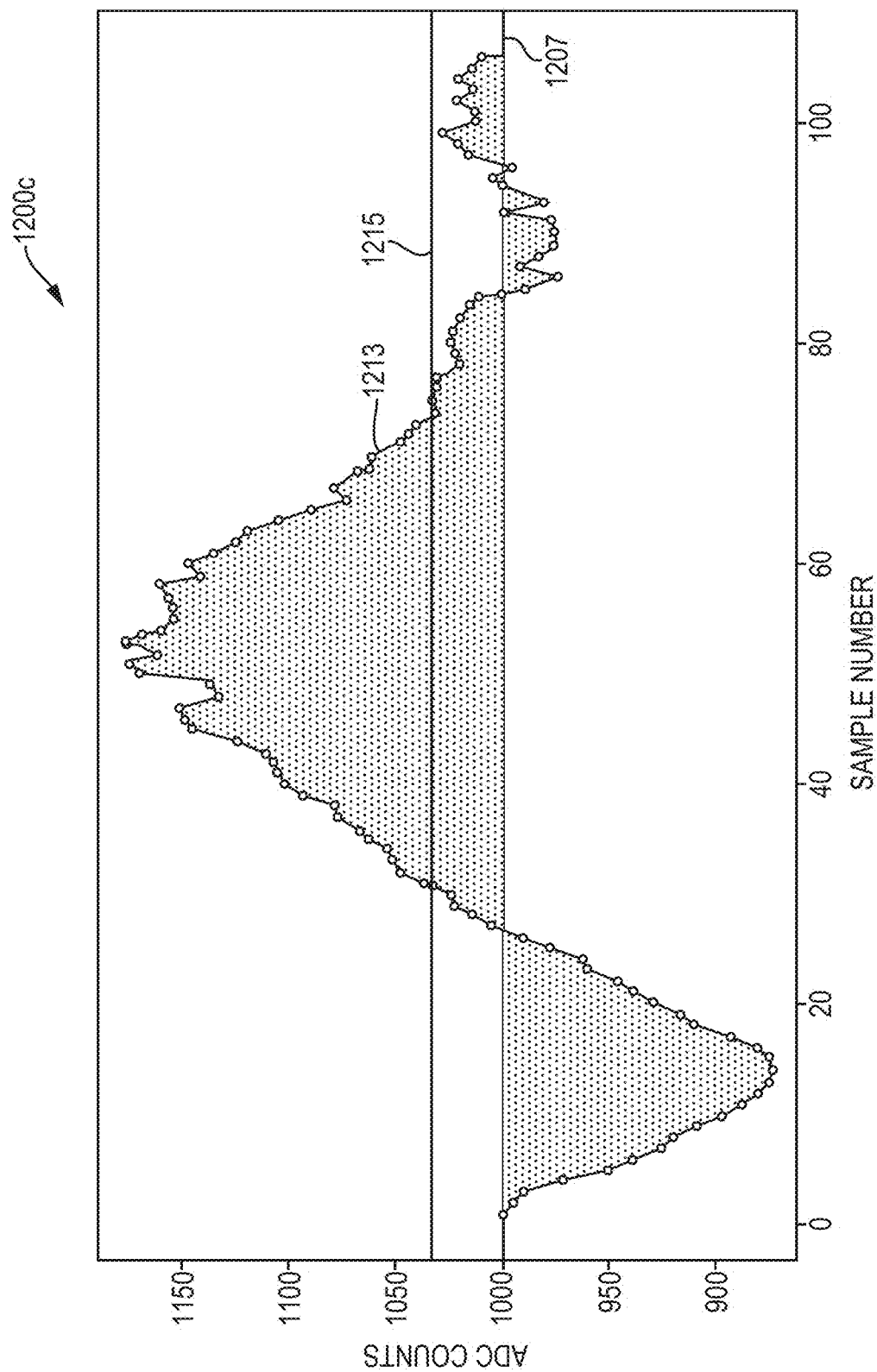

FIGS. 12A-12C depict another leakage measure or figure of merit that may be used to characterize a curvature of a container surface. FIG. 12A depicts a graph 1200a of a container side profile 1206a, similar to that of container side provide 1106a in FIG. 11. Container side profile 1206a may be obtained from a container traversing an inspection head. In particular, container side profile 1206a is observed to have a downward slope, indicating that a horizontal axis of the container is not parallel to the direction of travel of the container. In one aspect, container side profile 1206a may be rotated so that it is essentially parallel to the abscissa of graph 1200b, as illustrated by rotated container side profile 1206b. FIG. 12B illustrates a graph 1200b of the data presented in graph 1200a after the container side profile is rotated into an effectively horizontal position. An average value of rotated container side profile 1206b between delimiters AL and CR may be calculated, the value defining an average line 1207. In one aspect, average line 1207 may be considered a linear model of rotated container side profile 1206b. Residual values between rotated container side profile 1206b and average line 1207 may be calculated, in which a residual value is calculated as a difference between rotated container side profile 1206b and average line 1207 value at each point along the length of the abscissa. FIG. 12c depicts a graph 1200c of residual values 1213 along the length of the container. A leakage measure may be calculated from the residual values 1213 related to a total divergence of the container surface from a model flat surface. In one aspect, the leakage measure may be calculated as the root mean square (RMS or square root of the sum square error) of the residual values 1213. As an example, the RMS value of the residual values 1213 in graph 1200c may be plotted as RMS line 1215. In some examples, the RMS value may be scaled in a suitable manner, thereby defining a leakage measure. These calculations may result in a leakage measure or merit value based on a deviation of a container surface from a flat surface of a leak-free container.

It may be understood that additional values defining a leakage measure may be calculated. For example, a curvature of a container side profile based on a second derivative of the container sensor data between predetermined points, such as delimiters AL and CR, or BL and BR. Alternatively, an artificial neural network may be programmed using known leak-free and leaking containers to recognize characteristics of the container sensor data.

A container inspection system may include a control circuit having instructions to direct a rejection subsystem to remove a container from the conveyor system when the container is determined to have a leakage value outside of a predetermined leakage measure range. In one example, leakage ranges may be determined for a predetermined number (in one non-limiting example) of containers having known leakage characteristics. Thus, a predetermined number of model non-leaking containers may be analyzed according to any of the above leakage measures. Additionally, a predetermined number of model leaking containers may be analyzed according to any of the above leakage measures. Model leaking containers may include models demonstrating fluid leaks (concave container surfaces) or models demonstrating air leaks (convex container surfaces).

Figure 13A:
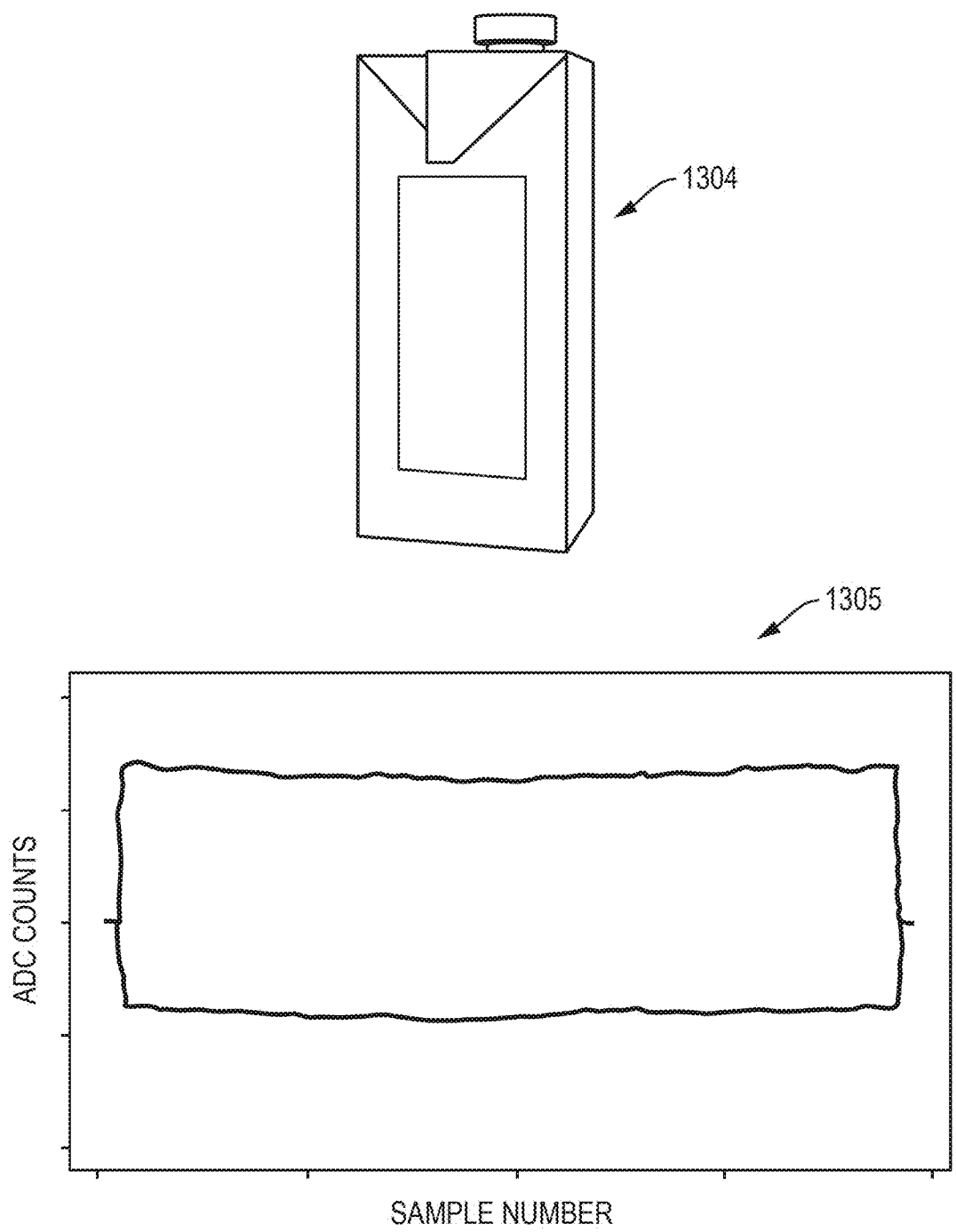
FIGS. 13A-13C depict exemplary container profiles of containers have no leaks, a fluid leak, and an air space leak according to one aspect of the present disclosure.
Figure 13B:
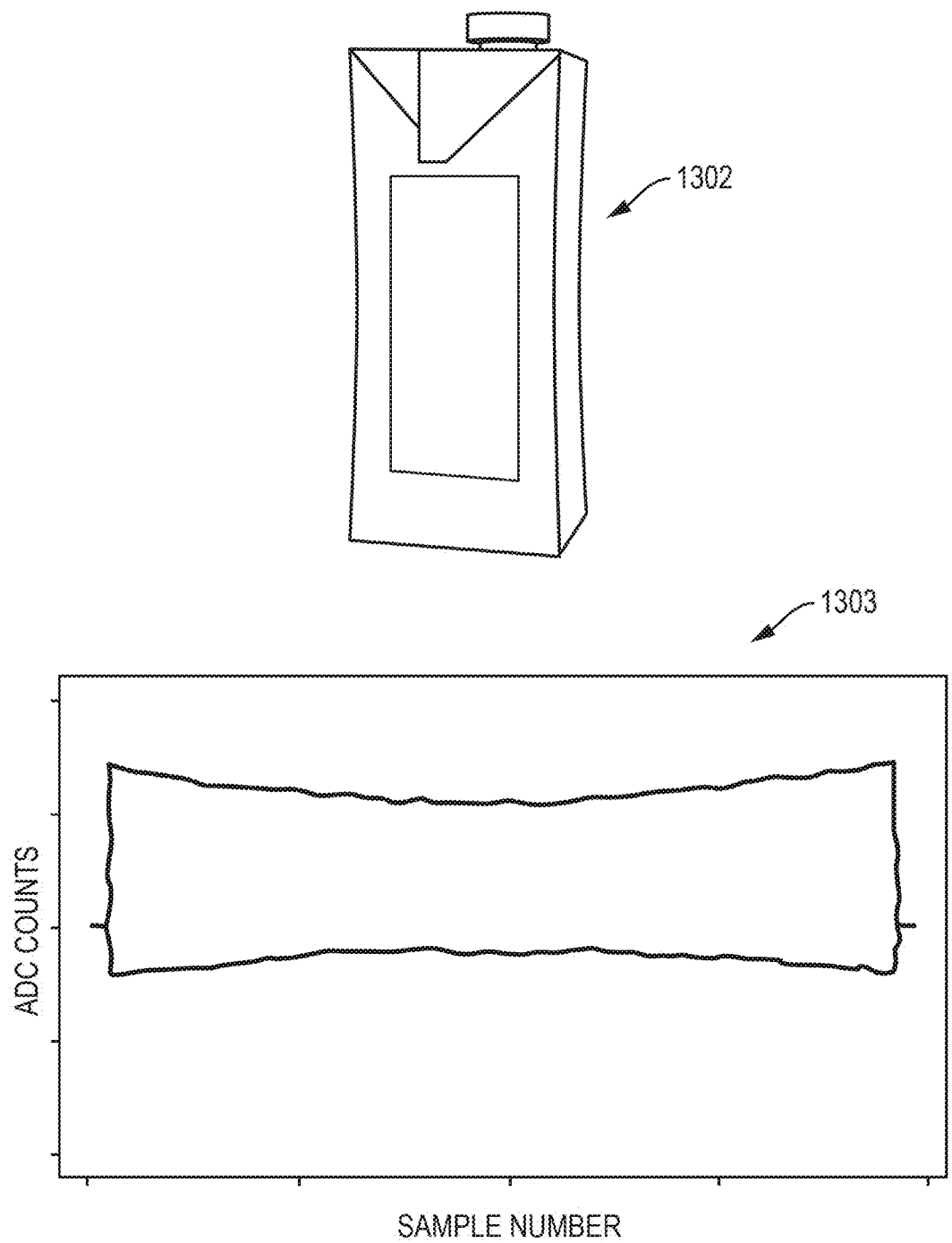
Figure 13C:
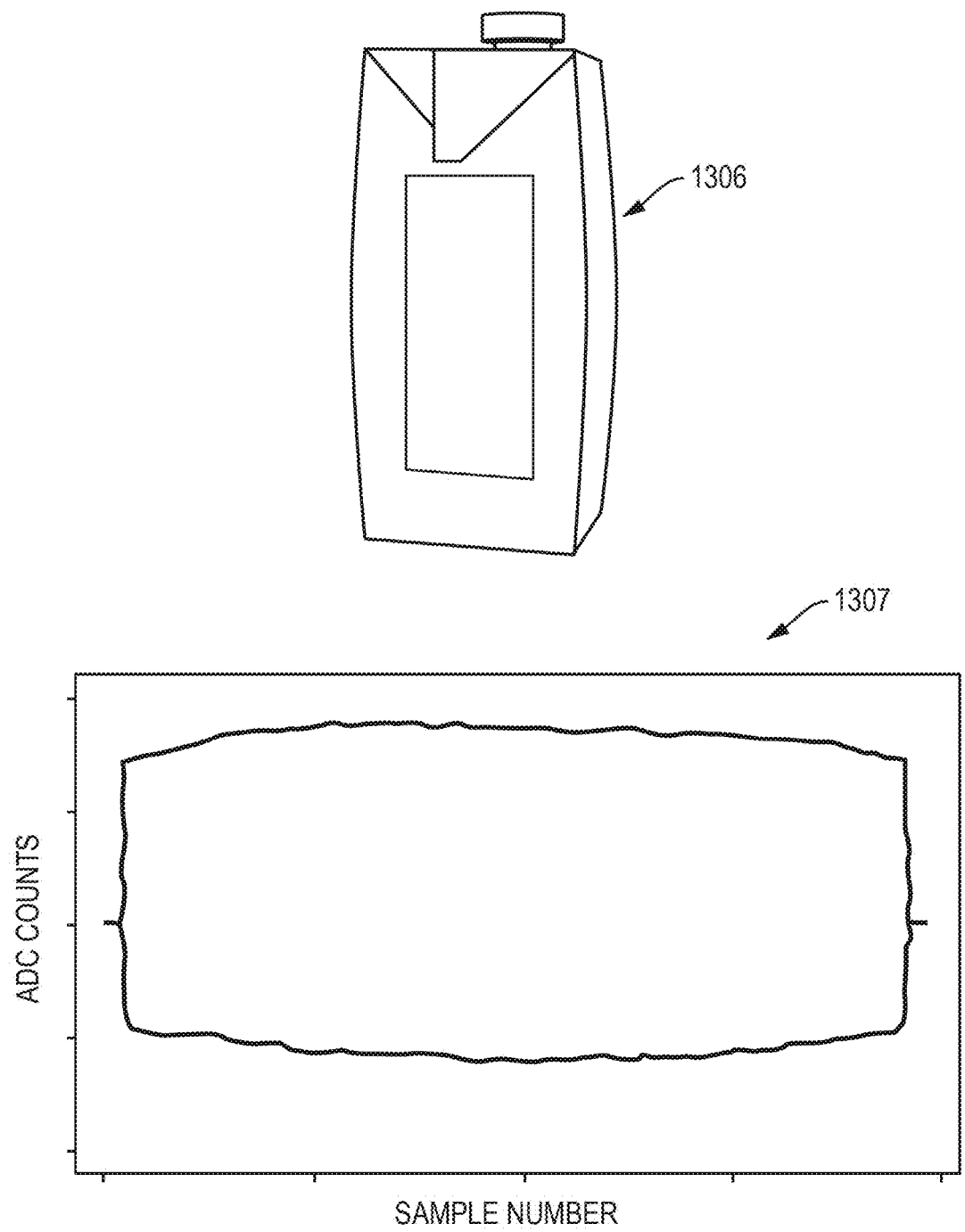

FIGS. 13A-13C depict exemplary model containers demonstrating non-leaking (FIG. 13A), fluid leaking (FIG. 13B), and air leaking (FIG. 13C) containers. FIG. 13A illustrates a non-leaking container 1304 and the equivalent cross section graph 1305 similar to the cross-section graph 1100 in FIG. 11. It may be observed that opposing sides of non-leaking container 1304 are approximately flat and parallel. FIG. 13B illustrates a fluid leaking container 1302 and the equivalent cross section graph 1303 similar to the cross-section graph 1100 in FIG. 11. It may be observed that opposing sides of fluid leaking container 1302 are concave. FIG. 13C illustrates an air leaking container 1306 and the equivalent cross section graph 1307 similar to the cross-section graph 1100 in FIG. 11. It may be observed that opposing sides of air leaking container 1306 are convex.

Figure 14:
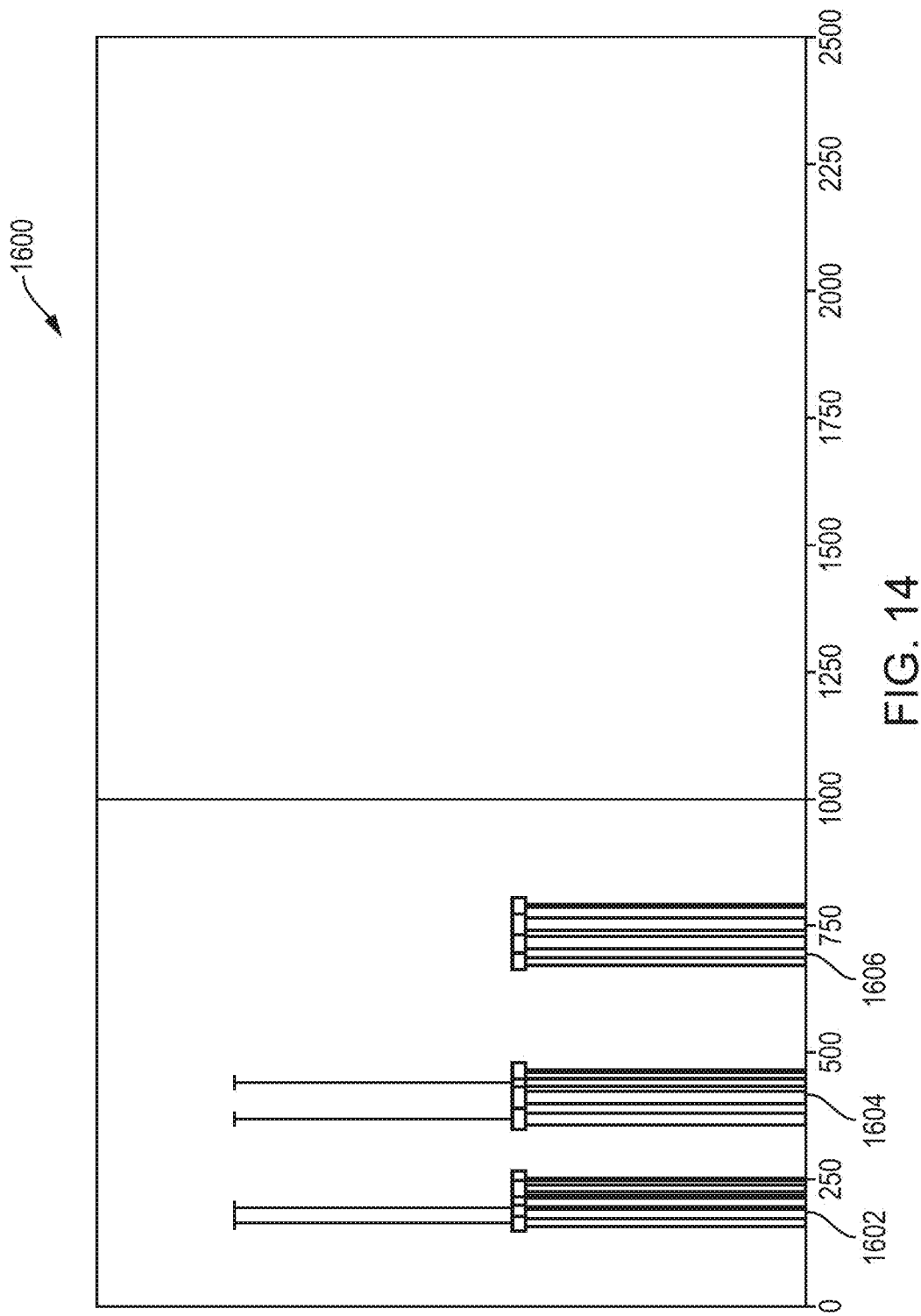
FIG. 14 depicts exemplary histograms of container leakage measures for leaking and non-leaking containers according to one aspect of the present disclosure.

FIG. 14 illustrates that the leakage values of the predetermined number of model containers may be graphed as histograms for the containers 1600 to determine an expected variation leakage measure. The ordinate of graph 1600 may refer to the number of containers having a particular value of a leakage measure. The abscissa of graph 1600 may refer to a leakage measure determined for a particular container. For a predetermined number of containers under test, containers indicating a fluid leakage (see FIG. 13B) may provide a fluid leak histogram 1602. For the predetermined number of containers under test, containers having no leakage (see FIG. 13A) may provide a fluid leak histogram 1604. For a predetermined number of containers under test, containers indicating an air leak (see FIG. 13C) may provide an air leak histogram 1606. Histograms 1600 illustrate that generally containers having fluid leaks 1602 may have lower leakage measure values than non-leaking containers 1604. Similarly, histograms 1600 illustrate that generally containers having air leaks 1606 may have higher leakage measure values than non-leaking containers 1604. In one aspect, the results of the histogram analysis may be used to develop a leakage measure range.

Figure 15:
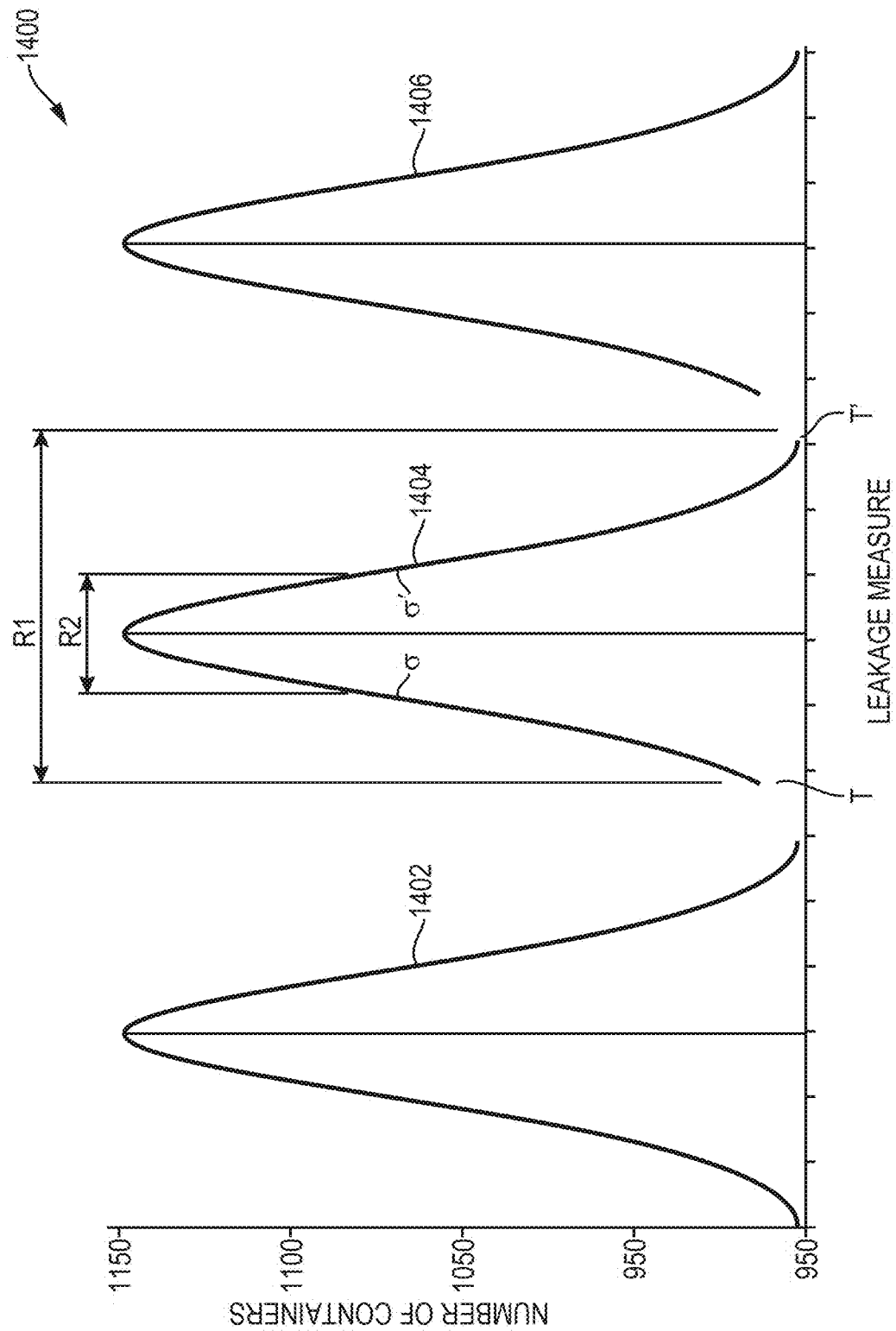
FIG. 15 is a graph of distributions of model leakage measure values for leaking and non-leaking containers according to one aspect of the present disclosure.

In one aspect, the resulting histograms may be modeled by Gaussian curves for ease of analysis. FIG. 15 depicts a graph 1400 of exemplary Gaussian plots of leakage measures of containers having fluid leak characteristics 1402, containers having non-leaking characteristics 1404, and containers having air leak characteristics 1406. The ordinate of graph 1400 may represent the number of containers having a particular leakage measure, and the abscissa may represent a value of a particular leakage measure. An acceptable leakage range of leakage measures may be derived from graphs such as 1400. If there is sufficient separation of leakage characteristic plots 1402, 1404, and 1406, as illustrated in graph 1400, an acceptable leakage range—that is, a range in leakage measures indicative of a non-leaking container—may be determined by the leakage measures defined by the tails (T, T') of the non-leaking characteristic plot 1404, resulting in acceptable leakage measure range R1. However, if there is significant overlap between leakage characteristic plots 1402, 1404, and 1406, the acceptable leakage range may be determined more narrowly. In one example, the acceptable leakage measure range may be defined by the one sigma values ($\sigma$, $\sigma'$) of the non-leaking characteristic plot 1404, for example leakage measure range R2. It may be understood that any suitable leakage measure range may be chosen based on the measured leakage characteristic plots 1402, 1404, and 1406.

Values for the analysis parameters such as AL, BL, BR, CR, and the defined values for an acceptable leakage measure range, may be chosen by an operator of the container inspection system. The operator may select these values based on sampled model containers having known leakage characteristics before the container inspection system is used under production conditions. It is possible that the operator may decide to change any one or more of these analysis parameters values as containers are being inspected to better control the inspection of the container during a specified production run. For example, if a set of analysis parameters results in too many non-leaking containers being rejected, the user may change one or more of the analysis parameters. Similarly, if a set of analysis parameters results in too many leaking containers being accepted, the user may change one or more of the analysis parameters. However, changing the analysis parameters during a production run may interrupt the run, thereby decreasing the efficiency of the container inspection process.

In one alternative, the control circuit may also include instructions that monitor the containers during inspection and alter the inspection parameters based on a predetermined number of previously inspected containers. In an additional alternative, the control circuit may switch the type of inspection analysis (for example from a difference measurement to a cross-section measurement) according to the analysis of previously inspected containers. Such automated control of the inspection process may be considered to be an auto-tracking control system.

An auto-tracking control system may include a method of tracking trends in the production container filling and leakage. The method allows the system to remain at maximum sensitivity, regardless of production fluctuations due to variation in the production process, such as: temperature, container fill level, and sealing differences. Auto-tracking may be accomplished by monitoring the mean or average leakage measure value readings and assigning a varying rejection limit based on normal production. A leakage measure value may be assigned to each container based on the container sensors readings when the containers activate the container detection system. A mean or average leakage measure value maybe calculated based on a pre-determined sample size parameter. In one non-limiting example, the pre-determined sample size parameter may be set to include the previous 25 containers, although other values for the pre-determined sample size parameter (either greater than or less than 25) may be used. Thus, initially, the mean or average leakage measure value calculation may be initiated after the first pre-determined sample size parameter number of containers have passed through the system. Thereafter, the mean or average leakage measure value may be updated after each container is inspected, based on the previous pre-determined sample size parameter number of containers. An offset limit (or soft rejection limit) value may thus be assigned based at least in part on the updated mean or average leakage measure value. The offset limit value may be updated as each is inspected. If the container leakage measure value falls below the updated offset value, then the container is automatically rejected from the production line. In one aspect, a hard rejection limit may be set by a system user, which does not change during the production run. If a container has a leakage measure value less than the hard rejection limit, it may be automatically rejected from the production line. The soft rejection limit and the hard rejection limit may define ranges in acceptable leakage measure values that extend both below the mean or average leakage measure value and above the mean or average leakage measure value.

In one aspect, a user may set the soft rejection limit based on a fixed value for the leakage measure that can deviate from the mean or average leakage measure value. For example, if a fixed value of "50" is used to define the soft rejection limit and the mean leakage measure value is 500, then the acceptable range of leakage measure values for the soft rejection limit may lie between 450 and 550. Similarly, a user may set a fixed value for the hard rejection limits.

In another aspect, the control circuit may calculate the variance and standard deviation for each mean or average leakage measure value. In this aspect, a system user may enter a number of standard deviations from the mean to define the soft rejection limits. In this aspect, the soft rejection limits may vary over the time of the production run, depending on the updated calculation of the standard deviation of the leakage measure.

Figure 16:
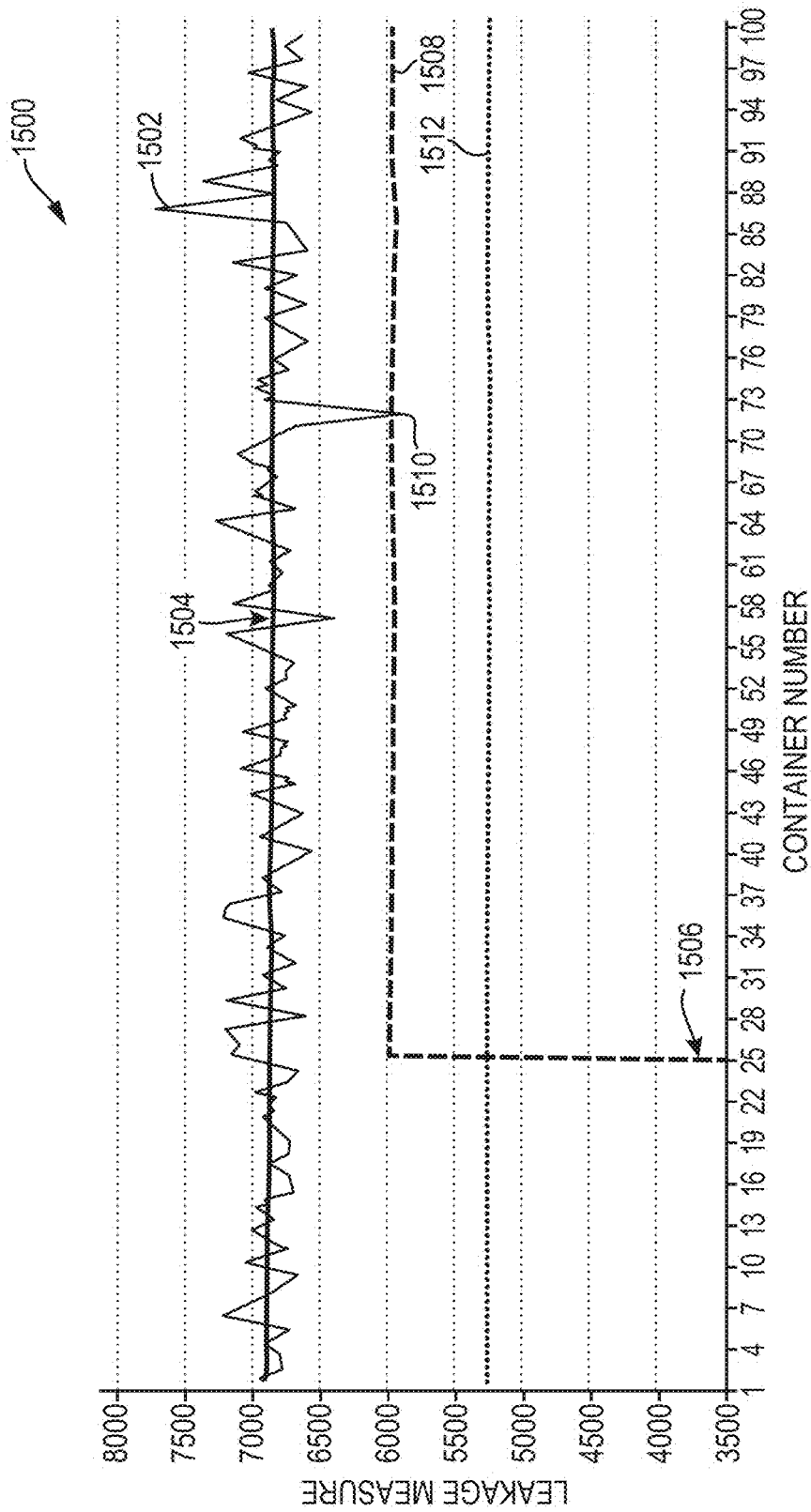
FIG. 16 is a graph of an auto-tracking method according to one aspect of the present disclosure.

FIG. 16 depicts a graph 1500 illustrating one aspect of an auto-tracking system for container inspection system. The ordinate is a container leakage measure value, and the abscissa provides a container number having a particular leakage measure value. An individual leakage measure value 1502 may be assigned to each container as it is inspected. It may be observed that there may be some variation in leakage measure value from one container to the next, reflecting some normal process variation in container size, an amount of container fill, and similar. An average or mean value of the leakage measure may be calculated for an aggregate number of containers. In one example, the average or mean value may be calculated as an arithmetic mean value. Other mean values (such as geometric mean, or harmonic mean) may also be used as well.

At a pre-determined sample size parameter 1506, the aggregate average or mean value of the leakage measure may switch to a running average, in which the mean or average value may be determined only for the previous pre-determined sample size number of containers. In FIG. 16, it may be observed that the pre-determined sample size parameter 1506 is set to 25 (as a non-limiting example) although any suitable number of containers may be used. For containers inspected after the pre-determined sample size, only the last pre-determined sample size number of containers may be included in the average or mean calculation. A soft limit 1508 of the leakage measure may be enforced after the pre-determined sample size number of containers is inspected. As discussed above, soft limit 1508 may be set according to a fixed value by the user of the inspection system. Alternatively, soft limit 1508 may be set according to a variation measurement associated with the calculated mean or average of the leakage value. Soft limit may vary over time according to changes in the mean or average leakage value, or changes in a variation measurement (variance or standard deviation) calculated along the mean. As may be observed in FIG. 16, container number 73 has leakage measure 1510 that is less than the soft limit 1508. The control circuit may detect this occurrence and send a signal to a rejection subsystem to remove the container from the production line and secure it for additional inspection. In one aspect, the control circuit may retain a copy of the surface scans and other data for the rejected container. The scans and other data may be archived for additional analyses, for example to determine if there were any anomalies associated with that container in any of the upstream processing systems and/or subsystems. FIG. 16 also illustrates a hard limit 1512 that may be set by a user of the inspection system before a production run begins. As disclosed above, hard limit 1512 may not change during a production run based on any gathered container statistics.

It may be noted that only the lower boundaries of soft limit 1508 and hard limit 1512 are illustrated in FIG. 16. However, it may be understood that equivalent upper boundaries to soft limit 1508 and hard limit 1512 may also be calculated, which both lie above mean or average leakage value 1504.

Having shown and described various aspects of the present disclosure, further adaptations of the methods and systems described herein may be accomplished by appropriate modifications by one of ordinary skill in the art without departing from the scope of the present disclosure. Several of such potential modifications have been mentioned, and others will be apparent to those skilled in the art. For instance, the examples, aspects, geometrics, materials, dimensions, ratios, steps, and the like discussed above are illustrative and are not required. Accordingly, the scope of the present disclosure should be considered in terms of the following claims and is understood not to be limited to the details of structure and operation shown and described in the specification and drawings.

While various details have been set forth in the foregoing description, it will be appreciated that the various aspects of the system and method for using sleep enhancement during sleep may be practiced without these specific details. One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Further, while several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

For conciseness and clarity of disclosure, selected aspects of the foregoing disclosure have been shown in block diagram form rather than in detail. Some portions of the detailed descriptions provided herein may be presented in terms of instructions that operate on data that is stored in a computer memory circuit. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing disclosure, it is appreciated that, throughout the foregoing disclosure, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory circuit device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one form, several portions of the subject matter described herein may be implemented via an application specific integrated circuits (ASIC), a field programmable gate array (FPGA), a digital signal processor (DSP), or other integrated formats. However, those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative form of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory circuit, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In some instances, one or more elements may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other. It is to be understood that depicted architectures of different components contained within, or connected with, different other components are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated also can be viewed as being "operably connected," or "operably coupled," to each other to achieve the desired functionality, and any two components capable of being so associated also can be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In other instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present disclosure have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "one form," or "a form" means that a particular feature, structure, or characteristic described in connection with the aspect is included in at least one aspect. Thus, appearances of the phrases "in one aspect," "in an aspect," "in one form," or "in an form" in various places throughout the specification are not necessarily all referring to the same aspect. Furthermore, the particular features, structures or characteristics may be combined in any suitable manner in one or more aspects.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

Various embodiments are described in the following numbered examples:

Example 1. A container inspection system including: an inspection head including: a housing having a first portion and a second portion defining an inspection zone therebetween; a container detection system to detect a presence of a container in the inspection zone; a first container sensor disposed in the first portion and a second container sensor disposed in the second portion, in which the first container sensor includes a first container sensor surface that is directed towards the inspection zone, and the second container sensor includes a second container sensor surface that is directed towards the inspection zone; and a control circuit including a processor and a memory circuit, in which the memory circuit includes instructions that when executed by the control circuit, causes the control circuit to: receive detection data from the container detection system; determine that the container has entered the inspection zone based on the detection data; receive first container sensor data from the first container sensor and receive second container sensor data from the second container sensor while the container traverses the inspection zone; characterize a feature of the container based at least in part on the first container sensor data and the second container sensor data; and determine a leakage measure of the container based at least in part on the characterized feature.

Example 2. The container inspection system of example 1, in which the characterized feature includes a surface curvature of one or more surfaces of the container.

Example 3. The container inspection system of example 1, in which the first container sensor is disposed opposite to the second container sensor across the inspection zone.

Example 4. The container inspection system of example 1, in which the first container sensor is mounted on a first container sensor carriage in the first portion and the second container sensor is mounted on a second container sensor carriage in the second portion.

Example 5. The container inspection system of example 1, in which the container detection system includes a light-beam interrupt detection system.

Example 6. The container inspection system of example 1, further including a container rejection subsystem to remove a container having a leakage measure outside of a pre-determined leakage measure range.

Example 7. The container inspection system of example 1, further including a container fill detection system.

Example 8. A container inspection head, including: a housing having a first portion and a second portion defining an inspection zone therebetween; a container detection system to detect a presence of a container in the inspection zone; and a first container sensor disposed on a first container sensor carriage disposed in the first portion and a second container sensor disposed on a second container sensor carriage disposed in the second portion, in which the first container sensor includes a first container sensor surface directed towards the inspection zone, the second container sensor includes a second container sensor surface directed towards the inspection zone; and the first container sensor is disposed opposite to the second container sensor across the inspection zone.

Example 9. The container inspection head of example 8, in which the first container sensor surface defines a first container sensor axis normal to the first container sensor surface, the second container sensor surface defines a second container sensor axis normal to the second container sensor surface, and the first container sensor axis and the second container sensor axis are not co-axial.

Example 10. The container inspection head of example 9, in which a first center of the first container sensor surface and a second center of the second container sensor surface define a horizontal axis, the first container sensor carriage is to direct the first container sensor axis at a non-zero angle with respect to the horizontal axis, and the second container sensor carriage is to direct the second container sensor axis at a non-zero angle with respect to the horizontal axis.

Example 11. The container inspection head of example 8, in which the first container sensor is a first laser ranging sensor and the second container sensor is a second laser ranging sensor.

Example 12. The container inspection head of example 8, in which the first container sensor is a first proximity sensor, and the second container sensor is a second proximity sensor.

Example 13. The container inspection head of example 8, further including a mounting system to adjust an axial displacement and a rotational displacement of the inspection head.

Example 14. The container inspection head of example 8, in which the first container sensor carriage is vertically adjustable within the first portion and the second container sensor carriage is vertically adjustable within the second portion.

Example 15. A method of inspecting a container, including: traversing a container through an inspection zone of a container inspection head; contacting a first surface of the container with a first emission of a first container sensor; contacting a second surface of the container with a second emission of a second container sensor; receiving a first backscatter from the first surface and a second backscatter from the second surface; determining a first characteristic of the first surface from the first backscatter and a second characteristic of the second surface from the second backscatter; determining a container leakage measure at least from the first characteristic and the second characteristic; and rejecting the container when the container leakage measure is outside of a predetermined leakage measure range.

Example 16. The method of example 15, in which determining the first characteristic of the first surface includes determining a first surface curvature of the first surface, and determining the second characteristic of the second surface includes determining a second surface curvature of the second surface.

Example 17. The method of example 15, in which determining the container leakage measure includes determining the container leakage measure from a cross-sectional measurement of the container.

Example 18. The method of example 15, further including determining a first limit and a second limit of the predetermined leakage measure range.

Example 19. The method of example 18, in which: determining the first limit and the second limit includes: characterizing the first characteristic of a first surface of each of a predetermined number of non-leaking containers; characterizing the second characteristic of a second surface of each of the predetermined number of the non-leaking containers; and determining the first limit and the second limit from an aggregate of the first characteristic of each of the non-leaking containers and the second characteristic of each of the non-leaking containers.

Example 20. The method of example 18, in which: determining the first limit and the second limit includes: characterizing the first characteristic of a first surface of each of a predetermined number of leaking containers; characterizing the second characteristic of a second surface of each of the predetermined number of the leaking containers; and determining the first limit and the second limit from an aggregate of the first characteristic of each of the leaking containers and the second characteristic of each of the leaking containers.

What is claimed is:

1. A container inspection system comprising:
an inspection head comprising:
a housing having a first portion and a second portion defining an inspection zone therebetween;
a container detection system to detect a presence of a container in the inspection zone;
a first container sensor disposed in the first portion and a second container sensor disposed in the second portion, wherein
the first container sensor comprises a first container sensor surface that is directed towards the inspection zone, and
the second container sensor comprise a second container sensor surface that is directed towards the inspection zone; wherein
the first container sensor is mounted on a first container sensor carriage in the first portion and the second container sensor is mounted on a second container sensor carriage in the second portion; and
a control circuit comprising a processor and a memory circuit, wherein the memory circuit comprises instructions that when executed by the control circuit, causes the control circuit to:
receive detection data from the container detection system;
determine that the container has entered the inspection zone based on the detection data;
receive first container sensor data from the first container sensor and receive second container sensor data from the second container sensor while the container traverses the inspection zone;
characterize a feature of the container based at least in part on the first container sensor data and the second container sensor data, wherein the characterized feature comprises a first surface curvature of a first side-wall of the container; and
determine a leakage measure of the container based at least in part on the characterized feature.

2. The container inspection system of claim 1, wherein the first container sensor is disposed opposite to the second container sensor across the inspection zone.

3. The container inspection system of claim 1, wherein the container detection system comprises a light-beam interrupt detection system.

4. The container inspection system of claim 1, further comprising a container rejection subsystem to remove a container having a leakage measure outside of a pre-determined leakage measure range.

5. The container inspection system of claim 1, further comprising a container fill detection system.

6. The container inspection system of claim 1, wherein the first container sensor surface defines a first container sensor axis normal to the first container sensor surface, the second container sensor surface defines a second container sensor axis normal to the second container sensor surface, and the first container sensor axis and the second container sensor axis are not co-axial.

7. The container inspection system of claim 6, wherein a first center of the first container sensor surface and a second center of the second container sensor surface define a horizontal axis,
the first container sensor carriage is to direct the first container sensor axis at a non-zero angle with respect to the horizontal axis, and the second container sensor carriage is to direct the second container sensor axis at a non-zero angle with respect to the horizontal axis.

8. The container inspection system of claim 1, wherein the first container sensor is a first laser ranging sensor and the second container sensor is a second laser ranging sensor.

9. The container inspection system of claim 1, wherein the first container sensor is a first proximity sensor, and the second container sensor is a second proximity sensor.

10. The container inspection system of claim 1, further comprising a mounting system to adjust an axial displacement and a rotational displacement of the inspection head.

11. The container inspection system of claim 1, wherein the first container sensor carriage is vertically adjustable within the first portion and the second container sensor carriage is vertically adjustable within the second portion.

12. The container inspection system of claim 1, wherein the characterized feature further comprises a second surface curvature of a second side-wall of the container.

13. The container inspection system of claim 12, wherein the first side-wall of the container is disposed opposite to the second side-wall of the container.

14. A method of inspecting a container, comprising:
traversing a container through an inspection zone of a container inspection head;
contacting a first side-wall of the container with a first emission of a first container sensor;
contacting a second side-wall of the container with a second emission of a second container sensor;
receiving a first backscatter from the first side-wall and a second backscatter from the second side-wall;
determining a first characteristic of the first side-wall from the first backscatter and a second characteristic of the second side-wall from the second backscatter;
determining a container leakage measure at least from the first characteristic and the second characteristic; and
rejecting the container when the container leakage measure is outside of a predetermined leakage measure range.

15. The method of claim 14, wherein
determining the first characteristic of the first side-wall comprises determining a first side-wall curvature of the first side-wall, and
determining the second characteristic of the second side-wall comprises determining a second side-wall curvature of the second side-wall.

16. The method of claim 14, wherein determining the container leakage measure comprises determining the container leakage measure from a cross-sectional measurement of the container.

17. The method of claim 14, further comprising determining a first limit and a second limit of the predetermined leakage measure range.

18. The method of claim 17, wherein:
determining the first limit and the second limit comprises:
characterizing the first characteristic of a first side-wall of each of a predetermined number of non-leaking containers;
characterizing the second characteristic of a second side-wall of each of the predetermined number of the non-leaking containers; and
determining the first limit and the second limit from an aggregate of the first characteristic of each of the non-leaking containers and the second characteristic of each of the non-leaking containers.

19. The method of claim 17, wherein:
determining the first limit and the second limit comprises:
characterizing the first characteristic of a first side-wall of each of a predetermined number of leaking containers;
characterizing the second characteristic of a second side-wall of each of the predetermined number of the leaking containers; and
determining the first limit and the second limit from an aggregate of the first characteristic of each of the leaking containers and the second characteristic of each of the leaking containers.

* * * * *